(12) United States Patent
Bai

(10) Patent No.: US 12,297,397 B2
(45) Date of Patent: May 13, 2025

(54) PROCESS FOR PRODUCING SOLID BIOMASS FUEL

(71) Applicant: Hong Mei Bai, Hong Kong (CN)

(72) Inventor: Hong Mei Bai, Hong Kong (CN)

( * ) Notice: Subject to any disclaimer, the term of this patent is extended or adjusted under 35 U.S.C. 154(b) by 0 days.

(21) Appl. No.: 18/030,811

(22) PCT Filed: Oct. 12, 2021

(86) PCT No.: PCT/GB2021/052635
§ 371 (c)(1),
(2) Date: Apr. 7, 2023

(87) PCT Pub. No.: WO2022/079427
PCT Pub. Date: Apr. 21, 2022

(65) Prior Publication Data
US 2023/0383206 A1 Nov. 30, 2023

(30) Foreign Application Priority Data

Oct. 12, 2020 (GB) .................................. 2016162

(51) Int. Cl.
*C10L 5/08* (2006.01)
*C10L 5/24* (2006.01)
(Continued)

(52) U.S. Cl.
CPC .................. *C10L 5/445* (2013.01); *C10L 5/08* (2013.01); *C10L 5/24* (2013.01); *C10L 5/28* (2013.01);
(Continued)

(58) Field of Classification Search
CPC ............ A63B 2209/00; A63B 53/0462; A63B 53/0466; C10L 2200/0469; C10L 2290/08; C10L 2290/10; C10L 2290/18; C10L 2290/22; C10L 2290/28; C10L 2290/30; C10L 2290/32; C10L 2290/50; C10L 2290/545; C10L 2290/546; C10L 5/08; C10L 5/24; C10L 5/28; C10L 5/363;
(Continued)

(56) References Cited

U.S. PATENT DOCUMENTS

2013/0244291 A1  9/2013  Retsina et al.
2015/0259616 A1  9/2015  Ono et al.
2019/0119593 A1* 4/2019  Hayashi .................. C10L 5/445

FOREIGN PATENT DOCUMENTS

DE  102011114232 A1  3/2013
EP      3712233 A1   9/2020
(Continued)

OTHER PUBLICATIONS

Intellectual Property Office Search Report for GB2016162.6, dated Mar. 11, 2021.
(Continued)

*Primary Examiner* — Ellen M McAvoy
*Assistant Examiner* — Chantel Graham
(74) *Attorney, Agent, or Firm* — Ryan T. Grace; Advent, LLP

(57) ABSTRACT

The present invention relates to a process for producing a solid biomass fuel, as well as a solid biomass fuel produced by said process. Additionally, the present invention relates to a combustion process comprising combusting said solid biomass fuel so as to produce energy.

17 Claims, 6 Drawing Sheets

MATERIAL MOVING
DIRECTION- SLG

WATER FLOW DIRECTION- SLG

(51) Int. Cl.
*C10L 5/28* (2006.01)
*C10L 5/44* (2006.01)

(52) U.S. Cl.
CPC ....... *C10L 5/442* (2013.01); *C10L 2200/0469* (2013.01); *C10L 2290/08* (2013.01); *C10L 2290/18* (2013.01); *C10L 2290/32* (2013.01)

(58) Field of Classification Search
CPC .......... C10L 5/442; C10L 5/445; C10L 9/083; C10L 5/44; Y02E 50/10; Y02E 50/30
See application file for complete search history.

(56) References Cited

FOREIGN PATENT DOCUMENTS

| | | | |
|---|---|---|---|
| GB | 2448531 | A | 10/2008 |
| GB | 2506864 | A | 4/2014 |
| GB | 2586120 | A | 2/2021 |
| GB | 2586230 | A | 2/2021 |
| GB | 2591789 | A | 8/2021 |
| GB | 2592842 | A | 9/2021 |
| WO | 2013162355 | A1 | 10/2013 |
| WO | 2017014028 | A1 | 1/2017 |

OTHER PUBLICATIONS

Intellectual Property Office Search Report for GB2016162.6, dated Oct. 1, 2021.
International Search Report and Written Opinion for PCT/GB2021/052635, dated May 1, 2022.

* cited by examiner

PROCESS FOR PRODUCING SOLID BIOMASS FUEL

FIELD OF THE INVENTION

The present invention relates to a process for producing a solid biomass fuel, as well as a solid biomass fuel produced by said process. Additionally, the present invention relates to a combustion process comprising combusting said solid biomass fuel so as to produce energy.

BACKGROUND OF THE INVENTION

Coal-fired power generation is used in power plants and industrial processes around the world. Coal and other fossil fuels are non-renewable energy resources. Over the last few decades, there have been calls to reduce the consumption of coal in coal-fired power stations and instead to use renewable resources for energy.

Fuels derived from biomass are an example of a renewable energy source that can be used to replace or at least partially replace coal. Biomass derived fuels can be burned in the presence of oxygen in power plants in combustion processes to produce energy. Biomass derived fuels can be combusted in traditional power plants originally designed for coal combustion, or biomass derived fuels can be combusted in power plants built specifically for biomass combustion. Certain forms of biomass can be mixed with coal and combusted in the same combustion process within a power plant. Such a process is known as coal co-firing of biomass. To be suitable for co-firing with coal, biomass derived fuel must typically have certain properties such as a certain level of quality and homogeneity with regard to properties. For example, biomass fuel comprised of particles of a homogenous size, density, moisture content etc. are particularly desirable in co-firing processes. It is also desirable that the biomass fuel contains a low level of ash. Levels of ash in biomass derived fuels are typically higher than those found in coal.

Various processes for producing solid biomass fuels from biomass sources are known. WO2014/087949 discloses a process for producing a solid biomass fuel in which a source of biomass is steam exploded before being molded into biomass blocks which are then heated so as to form the biomass fuel. The aim of the process is to produce biomass fuel with sufficient handleability during storage and with reduced chemical oxygen demand (COD) in discharged water during storage. The biomass source used in the process is palm kernel shell.

WO2016/056608 builds upon the teaching of WO2014/087949, and discloses a process for manufacturing solid biomass fuel in which the steam explosion step is not required to produce the fuel. The process comprises a molding step in which a biomass source is crushed before being compressed and molded into biomass blocks, before the biomass blocks are heated. The biomass source taught for use in said process is trees such as douglas fir, hemlock, cedar, cypress, European red pine, almond old tree, almond shell, acacia xylem part, acacia bark, walnut shell, sago palm, empty fruit bunches, meranti and rubber.

WO2017/175733 discloses a similar process comprising a molding step in which a biomass source is crushed before being compressed and molded into biomass blocks, before the biomass blocks are heated. The process of WO2017/175733 is directed to providing biomass fuel which exhibits low disintegration and achieves reduced COD in discharged water when exposed to rain water. The source of the biomass to be used in the process is selected from the rubber tree, acacia, meranti, eucalyptus, teak and a mixture of larch, spruce and birch.

WO2019/069849 aims to provide a biomass fuel that is easy to transport and store and that is resistant to spontaneous combustion during storage. The biomass fuel is made by a process comprising a molding step in which a biomass source is crushed before being compressed sand molded into biomass blocks, before the biomass blocks are heated. The biomass source for producing the fuel is selected from rubber trees, acacia trees, radiata pine, a mixture of larch, spruce and birch; and spruce, pine and fir.

WO2019/069860 discloses an apparatus for producing biomass solid fuel. The apparatus comprises a carbonisation furnace for carbonising a molded biomass product to obtain a biomass solid fuel. The apparatus further comprises a yield calculation unit, a temperature measurement unit and a control unit. The control unit controls the heat applied to the carbonisation furnace based upon the spontaneous combustion properties of the biomass fuel.

The molded biomass product is formed by pulverising a biomass source into pellets, before molding said pellets into a molded biomass product. The biomass source is selected from the rubber tree, acacia, dipterocarp, radia pine, a mixture of larch, spruce and birch or a mixture of spruce, pine and firs.

WO2018/181919 discloses a different process to those discussed above for producing a solid biomass fuel. The process involves a step of hydrothermal carbonisation of biomass in which a biomass source is pressurised in hot water so as to carbonise the biomass. The process is reported to provide a biomass fuel with high grindability in high yield and with reduced manufacturing costs. The source of the biomass is selected from husks, palm kernel shell, coconut palm, bamboo, empty fruit bunches, apricots and aubergines.

WO2017/175737 discloses a cooling apparatus for cooling carbonised biomass. The apparatus improves the cooling efficiency of semi-carbonised molded biomass. The apparatus cools the biomass by spraying water thereon. The cooler comprises a vibration flat plate and a spraying section for spraying water on the flat plate. The biomass fuel is produced by the same processes as discussed above. The source of biomass for producing the biomass fuel is douglas fir, hemlock, cedar, cypress, European red pine, almond old tree, almond shell, acacia xylem part, acacia bark, walnut shell, sago palm, empty fruit bunches, meranti and the rubber tree.

WO2014/050964 discloses a process for improving the grindability of biomass such that it can be ground with coal. The process involves increasing the moisture content of ground wood biomass to between 10 to 50%; densifying the biomass to have a density of 0.55 $g/cm^3$ or higher, before subjecting the biomass to torrefaction. The source of biomass includes wood chips, bark, wood shavings, and sawdust.

WO2013/162355 discloses a process for the preparation of biomass solid fuel in which the biomass raw material is washed with water at high temperature and pressure in order to remove salts and hydrophilic organic substances from the biomass raw material, before the biomass raw material is processed into solid fuel. The rationale of the washing process is to remove salts and their components such as alkali metal and halide ions. Such salts can cause serious problems when the biomass is combusted such as the formation of low melting point ashes which can result in slagging, fouling and agglomeration of ashes and bed materials upon combustion. The salts can also cause corrosion.

The inventors of the present invention have appreciated that the solid biomass fuels and processes for their production discussed in the above documents have various problems associated with them. For example, the biomass sources described in the above documents are all plants and trees that typically only occur naturally, and that are not easy to cultivate and harvest on a commercial scale. The inventors have appreciated that it would be advantageous to have a source of biomass that can be grown and harvested easily or that is available on a commercial scale. It would also be advantageous to have a source of biomass that can be grown and harvested such that the quality and specific characteristics of the biomass source can be controlled. It would also be advantageous to have an alternative biomass source that does not require extensive deforestation in order to provide sufficient amounts of the biomass source for use as fuel.

Additionally, it has been found by the inventors that the sources of biomass described in the above documents, all being comprised of wood and similar materials, when subjected to conventional pulverising techniques known in the art, form particles with a low degree of homogeneity. Furthermore, pulverising the biomass sources is expensive due to the nature of the wood and wood-like material being difficult to pulverise. The inventors of the present invention have appreciated that it would be advantageous to have a source of biomass that is more easily pulverised by conventional pulverising techniques known in the art, and that forms more homogenous sized particles when pulverised.

Additionally, it has been found by the inventors that solid biomass fuels prepared from the biomass sources discussed in the above documents and prepared by the processes in the above documents do not have sufficient water proof characteristics. Water proof characteristics are important for solid biomass fuels since they need to be dry (or at least sufficiently dry) when used in a combustion process (either on their own or when co-fired with coal). Biomass fuels are frequently exposed to moisture during storage or transportation (such as from rain water). Accordingly, biomass fuels with increased water proof capacity are desirable.

The present inventors have also appreciated that the biomass fuel production processes described in the above documents do not provide fuels with sufficient quality and uniformity. In particular, the processes discussed above do not provide sufficient control of the density of the biomass during the molding step.

The present inventors have also appreciated that there are problems with the existing washing processes known in the art, such as those discussed above, where biomass raw material is washed to achieve salt removal before being processed into fuels. Typically, in processes known in the art, higher temperatures and pressures are required for the washing processes in order to achieve sufficiently low salt levels. Such processes increase the costs of the fuel production processes due to the energy required to provide elevated temperature and pressure. The inventors have appreciated that it would be useful if the efficiency of the washing processes could be improved such that more effective salt removal can occur at lower temperatures.

The present inventors have also appreciated that in biomass fuel production processes known in the art, such as those discussed above, significant quantities of dust adheres to the solid biomass fuel. This dust is problematic because it may pollute the air during transport and packaging of the solid biomass fuel. The dust may also pollute the local environment.

Furthermore, when stored in the open air, dust particles form mildew and affect the performance and quality of the solid biomass fuel. Thus, it would be beneficial for dust on the surfaces of the particles of the solid biomass fuel to be removed.

SUMMARY OF THE INVENTION

The present invention addresses the problems discussed above associated with prior processes. It has been surprisingly found by the inventors of the present invention that certain sources of biomass that are useful in providing solid biomass fuels, can be grown and harvested on a commercial scale. In doing so, a fixed and constant source of biomass for the production of fuels can be provided in growth cycles. Additionally, growing and harvesting said sources of biomass on a commercial scale enables control of the quality and uniformity of the biomass source, for example by cultivation and breeding techniques.

Additionally, it has also been found by the inventors of the present invention that certain sources of biomass that are agricultural waste products can be used to produce solid biomass fuels.

In addition to the above, the inventors of the present invention have also found that biomass fuels with improved waterproof characteristics can be provided by modifying the pulverizing, molding and/or heating steps of the process. The adaptation and control of the pulverizing, molding and heating steps of the process of the invention has also been found to improve the quality and uniformity of the solid biomass fuel product, as well as impart certain physical characteristics to it that are highly preferable for use in a combustion process. Furthermore, the adaptation of the molding and heating steps has been found to increase the yield of the solid biomass fuel, and impart characteristics to the fuel that make it easier to transport and store. The inventors have found that the nature of the biomass source, and the specific features of the pulverization, molding and heating step act together to provide a superior biomass fuel product for use in combustion processes over those known in the art.

It has also been found by the inventors of the present invention that the efficiency of washing processes for removing substances such as salts from raw biomass materials can be increased by making certain adaptations to the washing step. As is explained in further detail below, it has been found that pulverizing biomass particles to a specific particle size before compressing the biomass powder prior to a washing step can impart certain advantages to the washing process, thereby increasing its effectiveness.

Finally, it has also been found by the inventors of the present invention that the problem of solid biomass fuels comprising dust particles after manufacture can be alleviated by the use of a step of washing the solid biomass fuel particles with an aqueous washing liquid after the fuel has been manufactured. Surprisingly, it has been found that such a step can be used to remove the dust particles from the fuel, thereby alleviating or eliminating the problems discussed above associated with the presence of dust particles being present in the solid fuel after manufacture. As an additional advantage of this step, other impurities that may be present in the fuel may be removed by the washing step. Such impurities include the salts and hydrophilic organic substances discussed above that may not have been effectively removed by a pre-manufacture washing step, and also other impurities that may have been introduced to the solid fuel during manufacture such as during molding or torrefaction steps.

Surprisingly, and in contrast to solid biomass fuels known in the art, it has been found possible to wash the solid biomass fuel particles of the present invention with an aqueous wash liquid after manufacture because of the good water proof properties of the solid biomass fuel particles (as discussed above). It has been found that many prior known solid biomass fuels have not been able to be satisfactorily washed due to not having sufficient waterproof properties to withstand a washing step. With particles that are not sufficiently waterproof, application of a washing liquid may cause the biomass solid fuel particles to absorb too much water or degrade. In such circumstances, said wet particles may absorb water, degrade and fall apart due to reduced structural integrity. Accordingly, it has been found not possible to wash certain known biomass fuel particles with a washing liquid. In contrast, with biomass solid fuels of the present invention, the excellent water proof properties of the fuel that are believed to be imparted by the optimised pulverising, molding and heating steps discussed above, mean that the solid biomass fuel particles can be effectively washed without being damaged or having their advantageous fuel properties compromised.

According to a first aspect of the invention, there is provided a process for producing a solid biomass fuel, wherein the process comprises the following sequential steps:
(i) providing one or more sources of biomass;
(ii) pulverising the one or more sources of biomass to provide a pulverised biomass powder with an average particle diameter (D50) of from 1000 μm to 20,000 μm;
optionally, (iii) compressing the pulverised biomass powder to provide a compressed biomass powder;
(iv) washing the compressed biomass powder or pulverised biomass powder with an aqueous wash liquid to provide a washed biomass powder;
(v) mechanically dewatering the washed biomass powder to provide a dewatered biomass powder and an aqueous effluent;
(vi) drying the dewatered biomass powder to provide a dried biomass powder;
(vii) molding the dried biomass powder so as to provide a molded biomass product;
(viii) heating the molded biomass product to a temperature of from 160° C. to 420° C. for a time period of from 0.25 to 5 hours so as to provide a solid biomass fuel; and
(ix) washing the solid biomass fuel with an aqueous wash liquid.

Typically, the one or more sources of biomass comprise, consist essentially of, or consist of agricultural waste, Calliandra calothyrsus, Acacia mangium, Albizia chinensis, Hevea brasiliensis, rice husk, straw, yam, corn cob, wood such as mixed wood, grass such as Pennisetum sinese Roxb, bagasse, sunflower stalks, wheat stalks, corn stalks, sorghum stalks, soybean stalk, peanut stalks, cotton stalks, rape stalks, coconut husks, palm kernel shell (PKS), oil palm tree such as oil palm tree trunk, seaweed, peanut hulls, or any combination thereof. Preferably, the one or more sources of biomass consist essentially of the one or more sources of biomass discussed above.

Preferably, the one or more sources of biomass comprise, consist essentially of, or consist of agricultural waste such as corn straw, sesame straw, straw, banana tree, peanut straw, palm empty fruit bunches (EFB), palm fiber, palm shell, oil palm tree such as oil palm tree trunk, bamboo, or any combination thereof. Preferably, the one or more sources of biomass consist essentially of the one or more sources of biomass discussed above.

More preferably, the one or more sources of biomass comprise, consist essentially of, or consist of straw, corn straw, or a combination thereof. Most preferably, the one or more sources of biomass consist essentially of straw, corn straw, or a combination thereof. In some embodiments, step (i) of providing one or more sources of biomass comprises (a) compressing the one or more sources of biomass so as to have a moisture content of less than 50% by weight; and/or (b) chopping the one or more sources of biomass so as to have an average particle diameter (D50) of from 30,000 μm to 60,000 μm. In these embodiments, preferably, the process comprises both steps (a) and (b). More preferably, the process comprises step (a) of compressing the one or more sources of biomass prior to step (b) of chopping the one or more sources of biomass. It is preferred that the process comprises such steps when the one or more sources of biomass comprises agricultural waste, such as grasses.

In embodiments where the moisture content of the one or more sources of biomass is 20% by weight or less, step (ii) of pulverising the one or more sources of biomass to provide a pulverised biomass powder with an average particle diameter (D50) of from 1000 μm to 20,000 μm may comprise crushing the one or more sources of biomass in a process involving the use of a negative pressure pneumatic conveyancing apparatus.

Preferably, the process comprises step (iii) of compressing the pulverised biomass powder to provide a compressed biomass powder. Typically, step (iii) of compressing the pulverised biomass powder to provide a compressed biomass powder comprises squeezing the pulverised biomass powder to provide a compressed biomass powder and an aqueous effluent. Typically, step (iii) of compressing the pulverised biomass powder to provide a compressed biomass powder is carried out when the pulverised biomass powder has a moisture content of 30% by weight or greater. However, step (iii) of compressing the pulverised biomass powder to provide a compressed biomass powder may also be carried out when the pulverised biomass powder has a lower moisture content. In preferred embodiments, the pulverised biomass powder has a moisture content of 30% by weight or greater, and the pulverised biomass powder is squeezed to provide a compressed biomass powder with a moisture content of less than 30% by weight, preferably less than 25% by weight, and more preferably less than 20% by weight.

Typically, step (iv) of washing the compressed biomass powder or pulverised biomass powder with an aqueous wash liquid to provide a washed biomass powder comprises washing the compressed biomass powder or pulverised biomass powder more than once, preferably, wherein the compressed biomass powder or pulverised biomass powder is washed in from two to ten successive washing stages, more preferably, wherein the compressed biomass powder or pulverised biomass powder is washed in from two to five successive wash stages. Typically, each successive washing stage comprises spraying the compressed biomass powder or pulverised biomass powder with the aqueous wash liquid and/or immersing the compressed biomass powder or pulverised biomass powder in the aqueous wash liquid.

Typically, the successive washing stages are performed in a counter current manner whereby aqueous wash effluent from a later washing stage is used as the aqueous washing liquid for an earlier washing stage, more preferably, wherein fresh aqueous washing liquid is used to wash the compressed biomass powder or pulverised biomass powder in a final washing stage, and wherein for each of the other washing stages, the aqueous wash liquid used comprises the aqueous wash effluent from the washing stage that immediately follows.

In an alternative embodiment, washing step (iv) comprises washing the pulverised biomass powder or compressed biomass powder with an aqueous wash liquid via a counter-current washing mechanism, whereby washing step (iv) is carried out in an apparatus comprising a screw adapted to transport the pulverised biomass powder or compressed biomass powder in a first direction through the apparatus; and wherein the apparatus is adapted to receive and transport the aqueous wash liquid in a second direction through the apparatus that is opposite to the first direction such that that the aqueous wash liquid contacts the pulverised biomass powder or compressed biomass powder within the apparatus.

Typically, the aqueous wash liquid is at a temperature of from 5° C. to 160° C. during step (iv) of washing the compressed biomass powder with an aqueous wash liquid to provide a washed biomass powder. Typically, the aqueous wash liquid is at a temperature of from 5° C. to 160° C. during each successive wash stage of step (iv). Preferably, the aqueous wash liquid is at a temperature of from 5° C. to 35° C. during step (iv) of washing the compressed biomass powder with an aqueous wash liquid to provide a washed biomass powder. More preferably, the aqueous wash liquid is at a temperature of from 5° C. to 35° C. during each successive wash stage of step (iv).

Typically, step (iv) of washing the compressed biomass powder or pulverised biomass powder with an aqueous wash liquid to provide a washed biomass powder is carried out at a pressure of from 1.1 bar to 15 bar, preferably, wherein step (iv) is carried out at atmospheric pressure, more preferably, wherein step (iv) is carried out at atmospheric pressure and a temperature of from 5° C. to 35° C.

Typically, step (v) of mechanically dewatering the washed biomass powder to provide a dewatered biomass powder and an aqueous effluent comprises compressing the washed biomass powder.

Typically, step (vi) of drying the dewatered biomass powder to provide a dried biomass powder comprises drying the dewatered biomass to provide a dried biomass powder with a moisture content of less than 15% by weight, and preferably from 10% to 15% by weight.

Typically, step (vi) of drying the dewatered biomass powder to provide a dried biomass powder further comprises mixing the pulverised biomass powder particles whilst drying.

Typically, step (vi) of drying the dewatered biomass powder to provide a dried biomass powder comprises drying the pulverised biomass powder in a drying cylinder.

Typically, where the moisture content of the dewatered biomass powder is 20% by weight or less, the process comprises drying the dewatered biomass powder in a single drying cylinder. Typically, where the moisture content of the dewatered biomass powder is 20% by weight or more, the process comprises drying the dewatered biomass powder in multiple drying cylinders.

Typically, step (vii) of molding the dried biomass powder so as to provide a molded biomass product comprises adapting the molding step such that the density of the molded biomass product is controlled, optionally wherein adapting the molding step such that the density of the molded biomass product is controlled comprises controlling the compression ratio of a mold used in said molding step.

In some embodiments, an additive is added to the dried biomass powder prior to step (vii) of molding the dried biomass powder, optionally wherein the additive increases the yield of the molded biomass product.

Typically, step (viii) of heating the molded biomass product is carried out for a time period of from 0.4 to 2.5 hours.

Typically, the step of heating the molded biomass product comprises heating the molded biomass product to a temperature of from 180° C. to 350° C. and preferably from 210° C. to 280° C.

Preferably, step (viii) of heating the molded biomass product is carried out for a time period of from 0.4 to 2.5 hours, and the step of heating the molded biomass product comprises heating the molded biomass product to a temperature of from 180° C. to 350° C., optionally from 210° C. to 280° C.

Typically, step (viii) of heating the molded biomass product comprises heating the molded biomass product under conditions so as to induce torrefaction of the molded biomass product.

Typically, step (viii) of heating the molded biomass product is adapted so as to control the uniformity of the solid biomass fuel, preferably wherein adapting step (viii) so as to control the uniformity of the solid biomass fuel comprises conducting step (viii) in an apparatus in which the molded biomass product is rotated whilst being heated. Preferably, adapting step (viii) so as to control the uniformity of the solid biomass fuel comprises controlling the speed or direction of rotation of the molded biomass product within the apparatus. In more preferable embodiments, the molded biomass product is rotated in the apparatus in both an anticlockwise and clockwise direction.

Typically, the process further comprises a step of cooling the solid biomass fuel after heating step (viii) and prior to (ix) of washing the solid biomass fuel with an aqueous wash liquid.

Typically, step (ix) of washing the solid biomass fuel with an aqueous wash liquid comprises spraying the solid biomass fuel with the aqueous wash liquid.

Typically, the process further comprises a step of removing dust particles from the solid biomass fuel, preferably wherein the step of removing dust particles from the solid biomass fuel is carried out concurrently to step (ix) of washing the solid biomass fuel with an aqueous wash liquid. Preferably, the step of removing dust particles from the solid biomass fuel comprises removing dust particles from the solid biomass fuel with a screen. Typically, the screen has a pore size of from 2 mm to 8 mm, preferably wherein the screen has a pore size of from 2 mm to 5 mm, and more preferably wherein the screen has a pore size of from 2 mm to 3 mm.

In some embodiments, a drum sieve is used to as a screening device to remove the dust particles from the solid biomass fuel, preferably wherein the drum sieve comprises a rotating drum sieve.

In some embodiments, the step of removing dust particles from the solid biomass fuel comprises subjecting the solid biomass fuel to vibration, rotation, rolling, or any combination thereof. In such embodiments, typically, the step of removing dust particles from the solid biomass fuel comprises using a vibrating screen, wherein the vibrating screen has a pore size of from 2 mm to 8 mm, preferably wherein the screen has a pore size of from 2 mm to 5 mm, and more preferably wherein the screen has a pore size of from 2 mm to 3 mm.

Preferably, the step of removing dust particles from the solid biomass fuel is carried out concurrently to step (ix) of washing the solid biomass fuel with an aqueous wash liquid, wherein step (ix) of washing the solid biomass fuel with an aqueous wash liquid comprises spraying the solid biomass fuel with the aqueous wash liquid, and wherein the screen is used to drain the aqueous wash liquid from the solid biomass fuel.

In some embodiments, the one or more sources of biomass consist essentially of, or consist of corn straw, sesame straw, straw, banana tree, peanut straw, palm empty fruit bunches (EFB), palm fiber, palm shell, oil palm tree such as oil palm tree trunk, bamboo, or any combination thereof, and wherein:
  (i) the solid biomass fuel has a potassium content of less than 10% by weight of the potassium content of the one or more sources of biomass, per unit weight;
  (ii) the washed biomass powder a potassium content of less than 10% by weight of the potassium content of the one or more sources of biomass, per unit weight;
  (iii) the washed biomass powder a nitrogen content of less than 90% by weight of the nitrogen content of the one or more sources of biomass, per unit weight;
  (iv) the washed biomass powder has a chlorine content of less than 90% by weight of the chlorine content of the one or more sources of biomass, per unit weight;
  (v) the washed biomass powder has a sulphur content of 60% or less of the sulphur content of the one or more sources of biomass, per unit weight; and/or
  (vi) the solid biomass fuel has a sulphur content of 50% or less of the sulphur content of the one or more sources of biomass, per unit weight.

In some embodiments, the one or more sources of biomass consist essentially of, or consist of corn straw, sesame straw, straw, banana tree, peanut straw, palm empty fruit bunches (EFB), palm fiber, palm shell, oil palm tree such as oil palm tree trunk, bamboo, or any combination thereof, and wherein:
  (i) the ash content of the washed biomass powder is 75% or less by weight of the ash content of the one or more sources of biomass, per unit weight;
  (ii) calorific value of the washed biomass powder is 2% or more than the calorific value of the one or more sources of biomass, per unit weight;
  (iii) the fixed carbon content of the solid biomass fuel is 40% or more by weight than the fixed carbon content of the one or more sources of biomass, per unit weight;
  (iv) the volatile matter content of the solid biomass fuel is 94% or less of the volatile matter content of the one or more sources of biomass, per unit weight; and/or
  (v) the calorific value of the solid biomass fuel is 16% or more higher than the calorific value of the one or more sources of biomass, per unit weight.

In some embodiments, the solid biomass fuel has one or more of the following properties: an ash content of the solid biomass fuel is 15% by weight or less, preferably 12% by weight or less; the potassium content of the solid biomass fuel is 0.2% by weight or less, preferably 0.1% by weight or less; the nitrogen content of the solid biomass fuel is 2% by weight or less, preferably 1% by weight or less; the chlorine content of the solid biomass fuel is 0.05% by weight or less, preferably 0.02% by weight or less; the sulphur content of the slid biomass fuel is 0.2% by weight or less, preferably 0.1% by weight or less; the fixed carbon content of the solid biomass fuel is 40% by weight or less, preferably 30% by weight or less; the volatile matter content of the solid biomass fuel is 15% by weight or less, preferably 12% by weight or less; the internal moisture content of the solid biomass fuel is 1% by weight or less, preferably 0.5% by weight or less; the received base moisture content of the solid biomass fuel is 6% by weight or less, preferably 4% by weight or less; or the calorific value of the solid biomass fuel is 4500 MJ/Kg or more, preferably 4750 MJ/Kg or more; preferably, wherein the solid biomass fuel has all of said properties.

In the embodiments described above, preferably, the sulphur content is determined according to DIN EN15289; the nitrogen content is determined according to DIN EN 15104; the fixed carbon content is determined according to DIN EN 51734; the ash content is determined according to EN 14775 at 550° C.; the volatile matter content is determined according to DIN EN 15148; the calorific value is determined according to DIN EN 14918; the chlorine content is determined according to ISO16994:2015; the potassium content is determined according to ISO16995:2015; the received base moisture content of the solid biomass fuel is determined according to GB/T211-2017; and/or the internal moisture content of the solid biomass fuel is determined according to DIN EN 14774.

In highly preferable embodiments, the one or more sources of biomass consist essentially of, or consist of straw, corn straw, or a combination thereof.

Preferably, the bulk density of the solid biomass fuel as determined according to DIN EN 15103 is from 1.0 to 1.4 $g/cm^3$, preferably from 1.1 to 1.3 $g/cm^3$, and more preferably from 1.2 to 1.3 $g/cm^3$.

Preferably, the solid biomass fuel is waterproof for up to 20 days, preferably up to 30 days, and more preferably up to 40 days.

Preferably, the PM1.0 emissions of the solid biomass fuel upon combustion is less than 175 mg/kg, preferably less than 150 mg/kg.

Preferably, the bulk density of the molded biomass product is A, and the bulk density of the biomass solid fuel is B, and wherein B/A is 0.55 to 1, wherein the bulk density is determined in accordance with DIN EN 15103.

Preferably, material derived from biomass is present in the solid biomass fuel in an amount of at least 95% by weight of the total fuel content of the solid biomass fuel.

According to a second aspect of the invention, there is provided a process for producing a solid biomass fuel, wherein the process comprises the following sequential steps:
  (i) providing one or more sources of biomass;
  (ii) pulverising the one or more sources of biomass to provide a pulverised biomass powder with an average particle diameter (D50) of from 1000 μm to 20,000 μm;
  optionally, (iii) compressing the pulverised biomass powder to provide a compressed biomass powder;
  (iv) washing the compressed biomass powder with an aqueous wash liquid to provide a washed biomass powder;
  (v) mechanically dewatering the washed biomass powder to provide a dewatered biomass powder and an aqueous effluent;
  (vi) drying the dewatered biomass powder to provide a dried biomass powder;
  (vii) molding the dried biomass powder so as to provide a molded biomass product; and (viii) heating the molded biomass product to a temperature of from 160° C. to 420° C. for a time period of from 0.25 to 5 hours so as to provide a solid biomass fuel;

wherein the one or more sources of biomass comprise, consist essentially of, or consist of sesame straw, palm empty fruit bunches (EFB), palm fiber, oil palm tree such as oil palm tree trunk, banana tree, *Calliandra calothyrsus, Acacia mangium, Albizia chinensis, Hevea brasiliensis*, rice husk, yam, corn cob, wood such as mixed wood, *Pennisetum* sinese Roxb, or any combination thereof.

Preferably, the process further comprises a step (viii) of washing the solid biomass fuel with an aqueous wash liquid.

Preferably, the process is as described above in accordance with the first aspect of the invention.

According to a third aspect of the invention, there is provided a solid biomass fuel obtainable or obtained by a process according to the first or second aspect of the invention.

According to a fourth aspect of the invention, there is provided a solid biomass fuel derived from one or more sources of biomass, wherein the one or more sources of biomass:

(i) consist of, or consist essentially of sesame straw;
(ii) consist of, or consist essentially of palm empty fruit bunches;
(iii) consist of, or consist essentially of palm fiber;
(iv) consist of, or consist essentially of banana tree;
(v) consist of, or consist essentially of oil palm tree trunk; or
(vi) comprise, consist of, or consist essentially of agricultural waste, *Calliandra calothyrsus, Acacia mangium, Albizia chinensis, Hevea brasiliensis*, rice husk, straw, yam, corn cob, wood such as mixed wood, grass such as *Pennisetum* sinese Roxb, bagasse, sunflower stalks, wheat stalks, corn stalks, sorghum stalks, soybean stalk, peanut stalks, cotton stalks, rape stalks, coconut husks, palm kernel shell (PKS), oil palm tree such as oil palm tree trunk, seaweed, peanut hulls, or any combination thereof, wherein the solid biomass fuel has one or more of the following properties: an ash content of the solid biomass fuel is 15% by weight or less, preferably 12% by weight or less; the potassium content of the solid biomass fuel is 0.2% by weight or less, preferably 0.1% by weight or less; the nitrogen content of the solid biomass fuel is 2% by weight or less, preferably 1% by weight or less; the chlorine content of the solid biomass fuel is 0.05% by weight or less, preferably 0.02% by weight or less; the sulphur content of the slid biomass fuel is 0.2% by weight or less, preferably 0.1% by weight or less; the fixed carbon content of the solid biomass fuel is 40% by weight or less, preferably 30% by weight or less; the volatile matter content of the solid biomass fuel is 15% by weight or less, preferably 12% by weight or less; the internal moisture content of the solid biomass fuel is 1% by weight or less, preferably 0.5% by weight or less; the received base moisture content of the solid biomass fuel is 6% by weight or less, preferably 4% by weight or less; or the calorific value of the solid biomass fuel is 4500 MJ/Kg or more, preferably 4750 MJ/Kg or more; preferably, wherein the solid biomass fuel has all of said properties.

Where the solid biomass fuel is as defined in option (v) above, preferably, the solid biomass fuel is derived from one or more sources of biomass that consist of or consist essentially of the mentioned one or more sources of biomass.

Preferably, the one or more sources of biomass or solid biomass fuel are as discussed above in accordance with the first or second aspect of the invention.

According to a fifth aspect of the invention, there is provided a combustion process comprising the step of combusting a solid biomass fuel according to the third or fourth aspects of the invention so as to produce energy.

Preferably, the solid biomass fuel is co-fired and combusted alongside a fossil fuel such as coal.

Preferably, the PM1.0 emissions of the process are less than 175 mg/kg, and preferably less than 150 mg/kg.

According to a sixth aspect of the invention, there is provided the use of a solid biomass fuel according to the third or fourth aspects of the invention in a combustion process, optionally wherein the use comprises using the solid biomass fuel in a process according to the fifth aspect of the invention, optionally wherein the combustion process comprises co-firing the solid biomass fuel alongside a fossil fuel, such as coal.

Preferably, the PM1.0 emissions of the combustion process are less than 175 mg/kg, and preferably less than 150 mg/kg.

According to a seventh aspect of the invention, there is provided the use of one or more sources of biomass to produce a solid biomass fuel, wherein (i) the one or more sources of biomass: comprise, consist of, or consist essentially of agricultural waste, *Calliandra calothyrsus, Acacia mangium, Albizia chinensis, Hevea brasiliensis*, rice husk, straw, yam, corn cob, wood such as mixed wood, grass such as *Pennisetum* sinese Roxb, bagasse, sunflower stalks, wheat stalks, corn stalks, sorghum stalks, soybean stalk, peanut stalks, cotton stalks, rape stalks, coconut husks, palm kernel shell (PKS), oil palm tree such as oil palm tree trunk, seaweed, peanut hulls, or any combination thereof, wherein the solid biomass fuel has one or more of the following properties: an ash content of the solid biomass fuel is 15% by weight or less, preferably 12% by weight or less; the potassium content of the solid biomass fuel is 0.2% by weight or less, preferably 0.1% by weight or less; the nitrogen content of the solid biomass fuel is 2% by weight or less, preferably 1% by weight or less; the chlorine content of the solid biomass fuel is 0.05% by weight or less, preferably 0.02% by weight or less; the sulphur content of the slid biomass fuel is 0.2% by weight or less, preferably 0.1% by weight or less; the fixed carbon content of the solid biomass fuel is 40% by weight or less, preferably 30% by weight or less; the volatile matter content of the solid biomass fuel is 15% by weight or less, preferably 12% by weight or less; the internal moisture content of the solid biomass fuel is 1% by weight or less, preferably 0.5% by weight or less; the received base moisture content of the solid biomass fuel is 6% by weight or less, preferably 4% by weight or less; or the calorific value of the solid biomass fuel is 4500 MJ/Kg or more, preferably 4750 MJ/Kg or more; preferably, wherein the solid biomass fuel has all of said properties; or (ii) wherein the one or more sources of biomass consist of, or consist essentially of sesame straw, banana tree, palm empty fruit bunches (EFB), oil palm tree trunk, palm fiber, or a combination thereof.

Preferably, the use comprises using the one or more sources of biomass in a process according to the first or second aspect of the invention, and/or wherein the solid biomass fuel is according to the third or fourth aspects of the invention.

DETAILED DESCRIPTION OF THE INVENTION

Sources of Biomass

Figure 1:
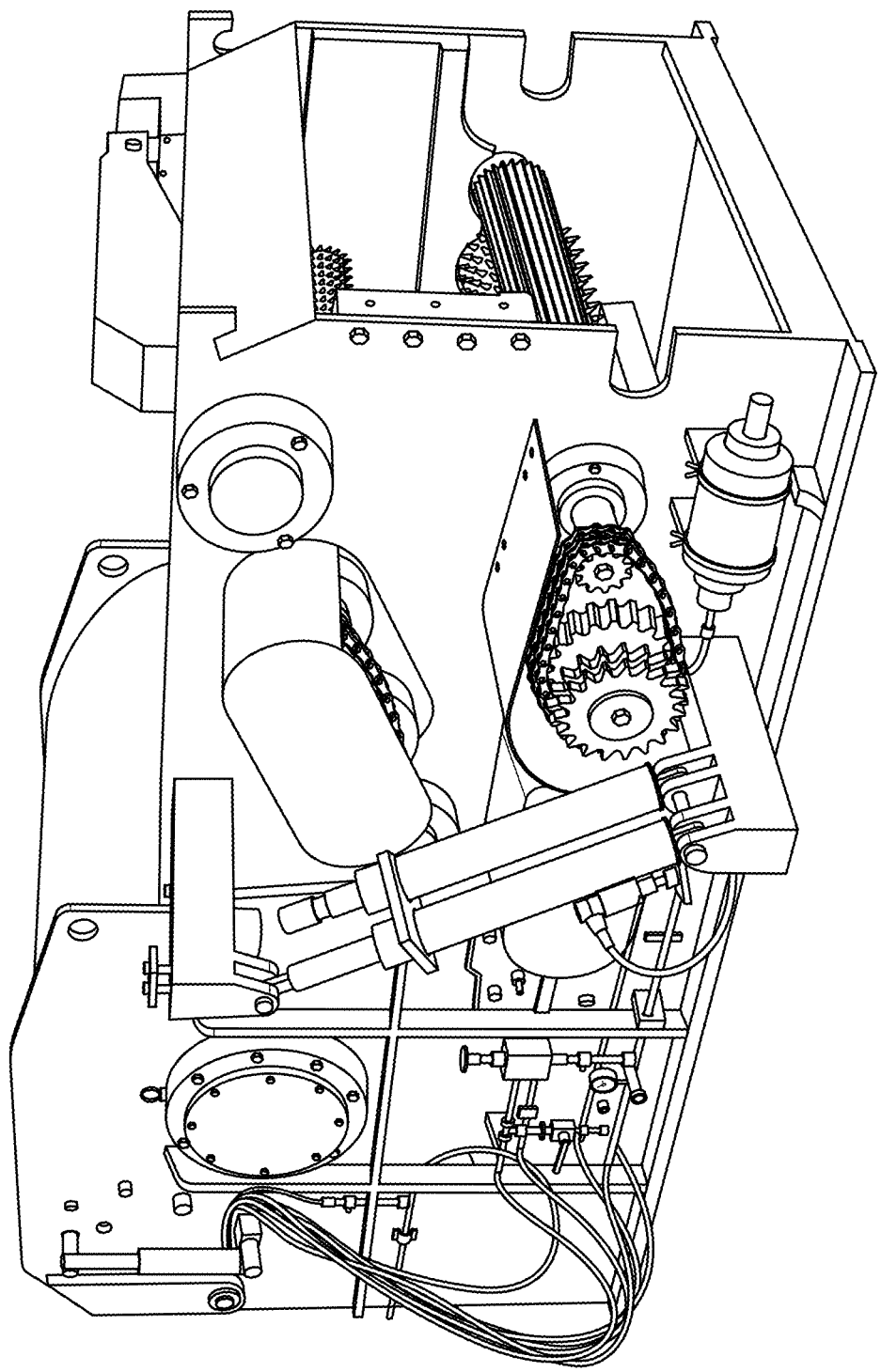
FIG. 1 is an illustration of a chipping apparatus that may be used in the process of the invention.

The one or more sources of biomass used in the present invention can be any form of plant based biomass suitable for processing into a solid biomass fuel. Preferably, the one or more sources of biomass used in accordance with the present invention is any of those discussed above. Typically, the one or more sources of biomass comprise agricultural waste. Many of the sources of biomass described above for use in accordance with the invention can be agricultural waste. The term "agricultural waste" as used herein typically refers to plant-based waste products that are produced as a by-product of agricultural operations. For example, agricultural waste may comprise left over plant-based products that are harvested, or unwanted components of harvested plant-based products.

The sources of biomass used in accordance with the invention may be produced as agricultural waste as a by-product of an agricultural operation. Alternatively, these sources of biomass may be grown specifically for the purpose of being a feedstock for the preparation of biomass solid fuels. Corn stalks are a particular example of a material that may be produced as agricultural waste. For example, corn may be grown and harvested for human consumption. When processing corn plants for human consumption, the process may involve removing the edible corn from the inedible corn cob. The corn cob and stalk is thus an agricultural waste product.

The one or more sources of biomass used in the present invention, such as those discussed above can be obtained or harvested by conventional methods known in the art.

The term "comprising" as used herein is used to mean that any further undefined component can be present. The term "consisting" as used herein is used to mean that no further components can be present, other than those specifically listed. The term "consisting essentially of" as used herein is used to mean that further undefined components may be present, but that those components do not materially affect the essential characteristics of the composition.

As discussed above, it has been found that the specific preferable one or more sources of biomass used in the present invention can be grown and harvested on a commercial scale, providing increased control of the quality and specific characteristics of the biomass source compared to the materials used in the prior art. Use of said materials also avoids the environmental damage associated with using trees such as necessary deforestation.

Use of the one or more sources of biomass used in the present invention has also surprisingly been found to be easier to grind than said prior used materials, such as wood. This reduces the costs of the grinding process.

Use of the materials of the invention, when ground, also provides a more homogenous mix of particle sizes than said prior used materials such as wood. Without being limited by theory, this is believed to impart advantageous properties to the final solid fuel product, such as greater uniformity and continuousness of the biomass fuel products. This is desirable in combustion processes for a number of reasons.

Providing One or More Sources of Biomass

The one or more sources of biomass may be provided by conventional harvesting and processing techniques known in the art. As discussed above, in some embodiments, the process of the invention may comprise a step of providing one or more sources of biomass with an average particle diameter (D50) of from 30,000 μm to 60,000 μm.

The one or more sources of biomass source may be reduced in size by standard techniques known in the art. The biomass may be reduced in size such that the biomass has an average particle diameter (D50) of from 30,000 μm to 60,000 μm such as an average particle diameter of from 40,000 μm to 50,000 μm.

In some embodiments, the one or more sources of biomass are provided as particles with a size in the above range by being introduced into a conventional chipping apparatus, although this will of course be dependent upon the specific source of biomass. For example, if the source of biomass occurs naturally with particles having sizes in the above range, then chipping will not be necessary. Accordingly, in some embodiments, the process of the invention may comprise chopping the one or more sources of biomass so as to have an average particle diameter (D50) of from 30,000 μm to 60,000 μm.

In some embodiments, the step of providing one or more sources of biomass with an average particle diameter (D50) of from 30,000 μm to 60,000 μm may comprise harvesting the one or more sources of biomass with a conventional combine. The combining process involves chopping and breaking up the one or more sources of biomass into particles of the desired size.

The step of providing one or more sources of biomass with an average particle diameter (D50) of from 30,000 μm to 60,000 μm may additionally comprise reducing the water content of the biomass to less than 50% by weight. Such a step may comprise compressing the one or more sources of biomass. This compression step typically squeezes moisture from the one or more sources of biomass such that the moisture content of the one or more sources of biomass is reduced to less than 50% by weight. Accordingly, in some embodiments, the step of providing biomass with a particle size as discussed above comprises compressing one or more sources of biomass with a moisture content of more than 70% by weight such that after compression, the moisture content of the one or more sources of biomass is less than 50% by weight.

In some embodiments, the step of providing biomass with a particle size as discussed above comprises both a step of compressing the biomass and also a step of chopping the biomass.

The chopping step and compression step (if included) may be carried out using separate apparatus. Alternatively, the steps may be carried out in a single apparatus configured for both chipping and compressing the biomass. For example, a motorised rolling device suitable for compressing biomass may be placed on a conveyor belt that feeds a conventional chipping device. In this respect, the biomass source is compressed before it enters the chipper. Apparatus suitable for carrying out compression and chipping steps of the one or more sources of biomass are known in the art. An example of an apparatus used for chipping is shown in FIG. 1. Chipping apparatus such as those shown in FIG. 1 typically work on the principle of material entering the chipper via a conveying system such as conveyor belt that feeds material through a feeding port. The material is then cut into chips by a high-speed rotating blade (not shown) and a blade mounted on the base of the machine (not shown). The functioning of said mechanism and of similar chipping mechanisms are known to the person skilled in the art.

Figure 2:
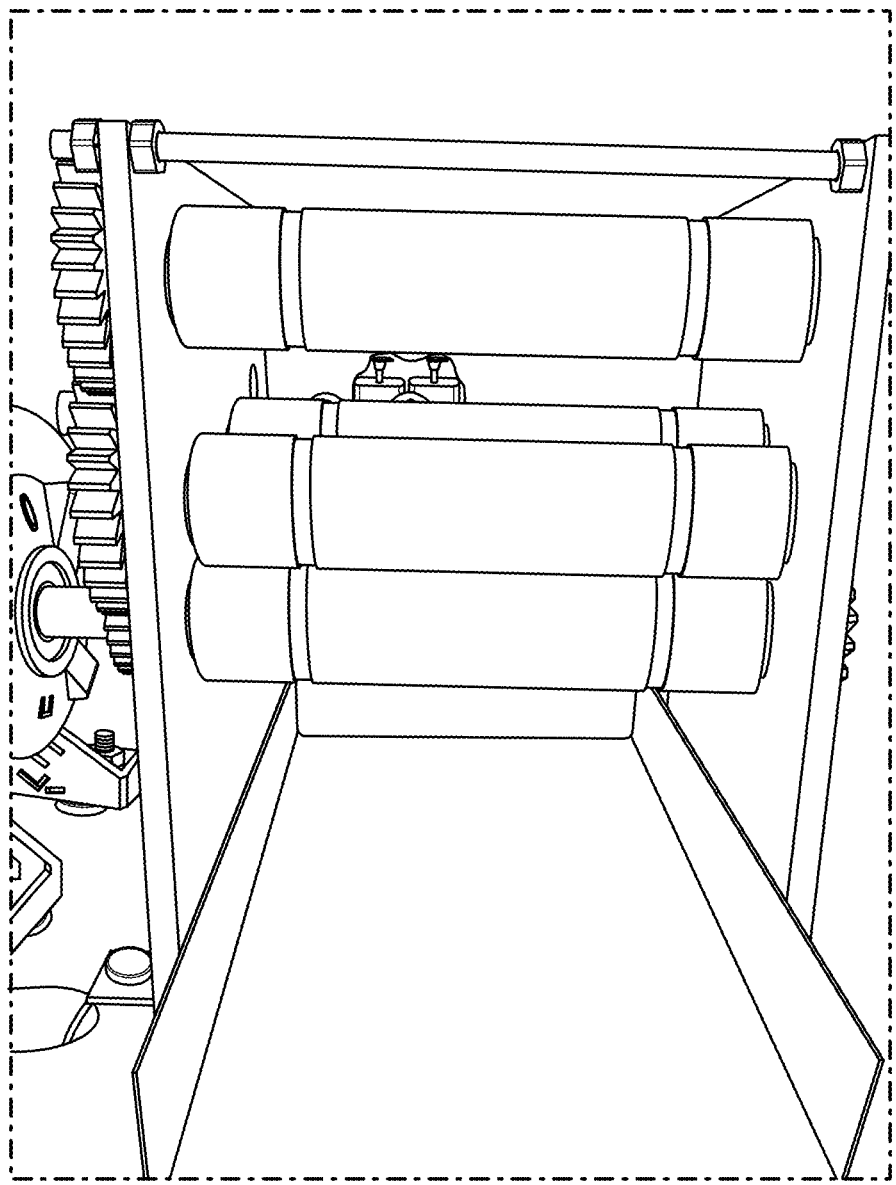
FIG. 2 is an illustration of a compression apparatus that may be used in the process of the invention.

An example of an apparatus used for the compression step is shown in FIG. 2.

As discussed above, in some embodiments, a rolling device such as that shown in FIG. 2 can be positioned on a conveyor belt to compress source material before said source material enters a chipping device, such as that shown in FIG. 1.

In other embodiments, the step of providing one or more sources of biomass does not comprise compressing the one or more sources of biomass, and/or does not comprise reducing the moisture content of the one or more sources of biomass.

Pulverisation of Biomass

Step (ii) comprises pulverising the one or more sources of biomass to provide a pulverised biomass powder with an average particle diameter (D50) of from 1000 µm to 20,000 µm.

The biomass source may be pulverised into a biomass powder by standard techniques known in the art. The biomass source may be pulverised such that the biomass powder has an average particle diameter (D50) of from 1000 µm to 20,000 µm. Preferably, the one or more sources of biomass are pulverised to have an average particle diameter of from 1000 µm to 10,000 µm, and more preferably from 1,000 to 5000 µm. As discussed above, pulverising the specific preferred biomass sources for use in the present invention has been found to provide a biomass powder with an advantageous smaller particle size distribution than provided by grinding prior known biomass sources, such as wood.

It has further been found that the smaller the particles of pulverised biomass powder within the limits specified above, the greater the quality and performance characteristics of the biomass solid fuel product. Without being limited by theory, this is believed to be due to greater uniformity and homogeneity of the final solid biomass fuel product. Smaller powder particle size and greater uniformity and homogeneity of the final fuel product is believed to be linked to improved performance characteristics of the fuel upon combustion, and also to improved water proof characteristics of the solid fuel product.

Prior to pulverisation, the one or more sources of biomass typically have an average particle diameter (D50) of from 30,000 µm to 60,000 µm and typically comprise less than 50% by weight of moisture.

Different pulverisation processes are preferred for different sources of biomass with different moisture contents. For example, when the moisture content of the one or more sources of biomass is 20% by weight or less, preferably, the step of pulverising the biomass involves the use of a negative pressure pneumatic conveyancing apparatus. Such negative pressure pneumatic conveyancing apparatus are known in the art.

When the moisture content of the one or more source of biomass is 20% by weight or greater, the one or more sources of biomass may be directly pulverised without the use of a negative pressure pneumatic conveyancing apparatus.

As discussed above, it has surprisingly been found that by pulverising the one or more sources of biomass to provide a pulverised biomass powder with an average particle diameter (D50) of from 1000 µm to 20,000 µm, certain advantages are provided to the subsequently carried out washing step (iv). Without being limited by theory, it is believed that the reduced particle size aids in the efficiency of the washing step. Reducing the particle size by pulverisation increases the surface area of the sources of biomass. When the pulverised biomass is subsequently washed, the larger surface area means that a more efficient and effective wash is carried out than when particles of a smaller surface area are washed. The greater efficiency and effectiveness of the washing process means that less harsh conditions can be used in the washing step, such as a lower temperature of the aqueous washing liquid used in the washing step. A lower temperature aqueous washing liquid means that a lower pressure may also be used, since higher pressures are not required to keep the water as a liquid since the water is at a lower temperature. Lower temperature and pressure for the process mean that the cost of the process can be reduced in comparison to prior art processes that typically use higher temperature and pressure washing steps to provide a more effective wash of biomass particles with a larger surface area. Safety is increased too by using lower temperatures and pressures. Hence, efficiencies are introduced by using a pulverisation step prior to washing. Due to the pulverisation step, it may also be possible to use less successive washing stages than prior art processes that typically use a great many successive washing stages in order to effectively wash the biomass raw materials.

However, it has been found by the inventors of the present invention that increasing the efficiency and effectiveness of the washing process is not as simple as just pulverising the sources of biomass to any smaller biomass particle size with increased surface area. If the size of the biomass is reduced too much (below 1000 µm) then the effectiveness of the washing process is negatively affected. This is, inter alia, due to greater difficulty in separating the water from the washed biomass after washing (for example in a subsequent compression step) as the mixture of water and pulverised biomass may form a slurry where the solid particles have less structural integrity, and the fact that the wash water may carry away the pulverised biomass during the washing step (for example if a mesh or screen is used to drain wash water from the biomass), reducing the yield of the process, unless complex equipment is used to prevent this happening. Accordingly, it has thus been found that a pulverised biomass powder with an average particle diameter (D50) of from 1000 µm to 20,000 µm is optimum for enhancing the efficiency of the subsequent washing step.

Compressing the Pulverised Biomass Powder

The process of the invention may comprise step (iii) of compressing the pulverised biomass powder to provide a compressed biomass powder.

Compression of the biomass after pulverisation may typically be desired if the biomass powder has a moisture content of greater than 30% by weight, although compression may also be carried out on biomass powder with lower moisture contents. In general, compression of the biomass powder prior to washing has been found advantageous irrespective of the moisture content of the pulverised biomass.

Figure 3:
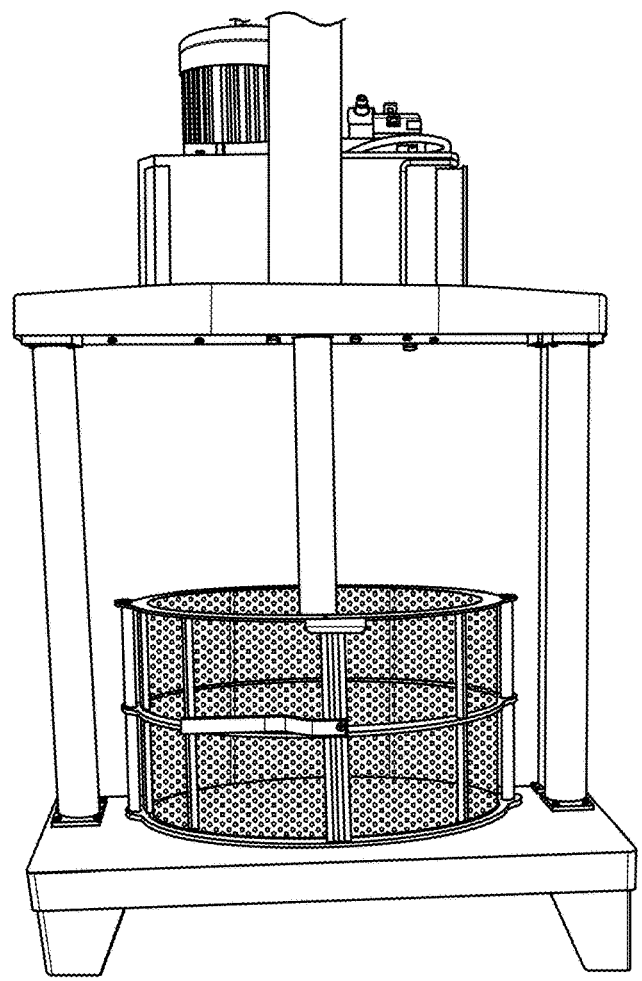
FIG. 3 is an illustration of a compression apparatus that may be used in the process of the invention.

The compression step may involve compressing the biomass powder using suitable apparatus known in the art. An example of such an apparatus is shown in FIG. 3. Such an apparatus operates by compressing the biomass powder with a hydraulic compression device. Material can be inserted into the meshed container shown in FIG. 3. The material may then be subjected to hydraulic compression with a hydraulic compression device causing water to exit the meshed container through the holes of the mesh.

Figure 4:
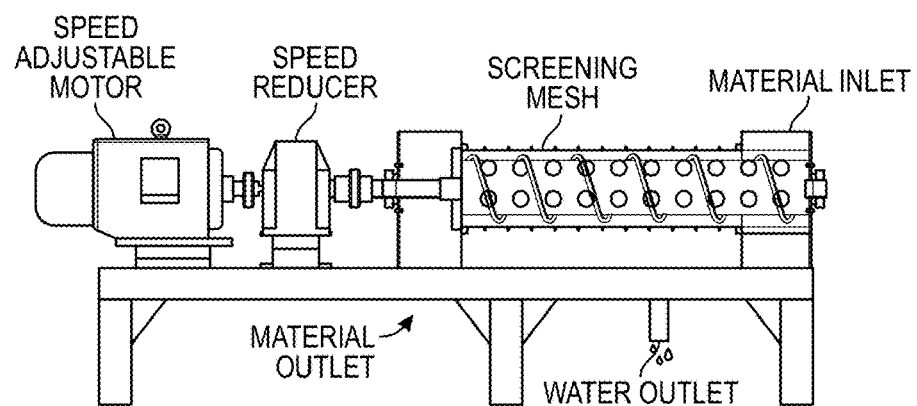
FIG. 4 is a diagram of a compression apparatus that may be used in the process of the invention.

Another apparatus that may be used to compress biomass powder is that shown in FIG. 4, which is a screw water squeezing machine. The material to be compressed is introduced into the spiral extrusion vessel. Moisture from the material is squeezed through the screen mesh by rotation of the motor-driven spiral screw.

It has been found that carrying out a compression step after the biomass has been pulverised as discussed above provides a compressed biomass powder with even lower water content. Typically, the moisture content of the compressed biomass powder is less than 30% by weight, such as less than 25% by weight or less than 20% by weight.

Surprisingly, it has been found by the inventors of the present invention that the step of compressing the pulverised biomass powder to provide compressed biomass powder imparts various advantages to the subsequently carried out washing step. Compressing the pulverised biomass powder results in a reduced water content of the biomass. When the biomass is then subsequently washed with water (for example, by spraying or immersing the biomass in water as described in further detail below), the washing water is able to more effectively wash the compressed biomass powder due to its reduced water content. Without being limited by theory, this is believed to be because the reduced moisture content of the biomass allows the wash water to better penetrate the biomass during washing due to a greater diffusion gradient. The improved efficiency and effectiveness of the washing step means that lower temperatures and pressures can be used in the washing step, providing the advantages discussed above. As also discussed above, it has been found that an average particle diameter (D50) of from 1000 μm to 20,000 μm for the pulverised biomass powder is particularly advantageous for the compression step, since it is easier to remove moisture from particles of such a size when compressing the biomass.

In other embodiments, the process of the invention does not comprise a step of compressing the pulverised biomass powder, and/or, does not comprise reducing the moisture content of the pulverised biomass powder.

Washing of the Pulverised Biomass Powder

The process comprises a step of washing the compressed biomass powder or the pulverised biomass with an aqueous wash liquid to provide a washed biomass powder. The washing step has been found by the inventors to be advantageous in that it removes minerals such as potassium, sodium, chlorine, calcium and phosphorus containing salts from the biomass. Having less minerals in the biomass powder eases the subsequent heating (torrefaction) process described below, and also makes it easier to combust the solid biomass fuel once formed. The presence of minerals such as salts can cause serious problems when the biomass is combusted such as the formation of low melting point ashes which can result in slagging, fouling and agglomeration of ashes and bed materials upon combustion. The salts can also cause corrosion.

As discussed above, preferably, the washing process involves washing the compressed biomass powder or pulverised biomass powder more than once, in successive washing stages. An advantage of the present invention is that less successive washing stages may be used that washing processes known in the art, whilst achieving the same effectiveness of washing and mineral salt removal. Without being limited by theory, this is believed to be due to the adaptation of the pulverisation and compression steps prior to washing discussed in detail above.

Each successive washing stage may comprises spraying the compressed biomass powder or pulverised biomass powder with the aqueous wash liquid and/or immersing the compressed biomass powder or pulverised biomass powder in the aqueous wash liquid. The wash liquid may be removed from each successive washing stage by, for example, a mesh or screen that drains the wash liquid from the biomass. The mesh or screen may have a mesh size smaller than the size of the compressed or pulverised biomass powder such that the compressed or pulverised biomass powder sits upon the screen, with the aqueous wash liquid draining from the screen so as to be removed from each successive wash stage.

Any suitable aqueous washing liquid may be used. Examples of aqueous washing liquids include water. Preferably, the water is pure and does not comprise salts or other compounds dissolved or dispersed therein. However, the aqueous washing liquid may contain other components dissolved or dispersed therein if desired.

Figure 5:
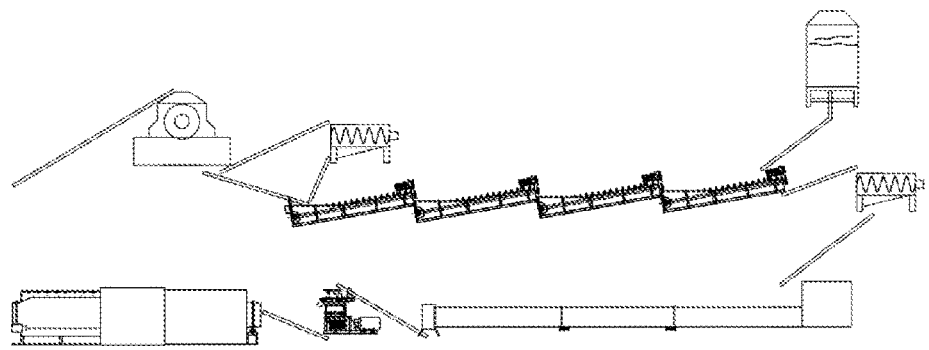
FIG. 5 is a diagram of an apparatus that may be used for washing step (iv) of the process of the invention.

A suitable apparatus for washing the pulverised biomass powder is shown in FIG. 5. The compressed or pulverised biomass powder enters on the left hand side of the apparatus shown in FIG. 5. Water enters on the right hand side of the apparatus shown in FIG. 5. There are four successive washing stages shown in the apparatus in FIG. 5. The compressed or pulverised biomass powder is washed at each stage. Fresh aqueous washing liquid such as water used to wash the biomass in the final successive washing stage on the far right of the diagram. The wash water from the final washing stage is then drained and collected after washing before being used as the wash water for the third washing stage. The wash water from the third washing stage is then collected and used as the wash water for the second washing stage, and vice versa for the second and first washing stages. In this respect, the biomass powder is washed in a counter current manner. Washing in such a manner has been found to advantageously provide more effective washing and mineral salt removal.

As discussed above, the compressed or pulverised biomass powder can be sprayed with or immersed in the aqueous wash liquid. In embodiments where the compressed or pulverised biomass powder is sprayed with the aqueous wash liquid, the washing step of the process of the invention may also comprise brushing the pulverised or compressed biomass powder during or after the step of spraying the pulverised or compressed biomass powder with the washing liquid.

For example, the apparatus shown in FIG. 5 may be used to spray the pulverised biomass powder with a washing liquid whilst simultaneously brushing the washing liquid from the pulverised or compressed biomass powder. Alternatively, the machine shown in FIG. 5 may be used to brush the pulverised or compressed biomass powder after it has been sprayed with washing liquid.

Apparatus that may be used in accordance with the washing step discussed above, such as the apparatus shown in FIG. 5, may comprise a washing drum within which the pulverised or compressed biomass powder is placed. The pulverised biomass powder may then be sprayed by a suitable spraying component (typically a spraying tube) before being brushed by a suitable brushing component (typically a brush plate). Alternatively, the brushing component can brush the pulverised biomass powder at the same time as the pulverised biomass is sprayed.

The step of brushing the compressed or pulverised biomass powder during or after the washing stages has advantageously been found to increase the effectiveness of the washing step and aid in removal of the mineral salts discussed above. The brushing step may also aid in cleaning the biomass by removing dirt and other impurities from the compressed or pulverised biomass powder.

Accordingly, at least one washing stage of washing step (iv) comprises brushing the compressed or pulverised biomass powder during or after washing. Preferably, each successive washing stage of washing step (iv) comprises brushing the compressed or pulverised biomass powder during or after washing.

Apparatus that may be used in accordance with the washing step discussed above, such as the apparatus shown in FIG. 5, may comprise water tanks, such as water tanks situated beneath a washing drum. In some embodiments, each successive washing stage of washing step (iv) comprises a washing drum and two washing tanks. One washing tank may be used to supply fresh water to a washing tube or other suitable washing liquid providing component for spraying or immersing the compressed or pulverised biomass powder. The other washing tank may collect the washing liquid that has been used to spray the pulverised or compressed biomass powder. Once the washing liquid is collected in this water tank, it may be filtered in the water tank by a suitable filtering component so as to produce clean water that can be recycled and used again in another washing stage, for example, a preceding washing stage, such as in a counter current process described above.

In some embodiments, the process of the invention comprises a washing step in which the pulverised or compressed biomass powder is placed in a washing drum that is rotated. In some embodiments, the pulverised biomass powder is placed in the rotating washing drum and sprayed with a washing liquid so as to wash the pulverised biomass powder, before the washed powder is brushed.

Other features of washing step (iv) may be as described in WO2013162355.

Figure 9:
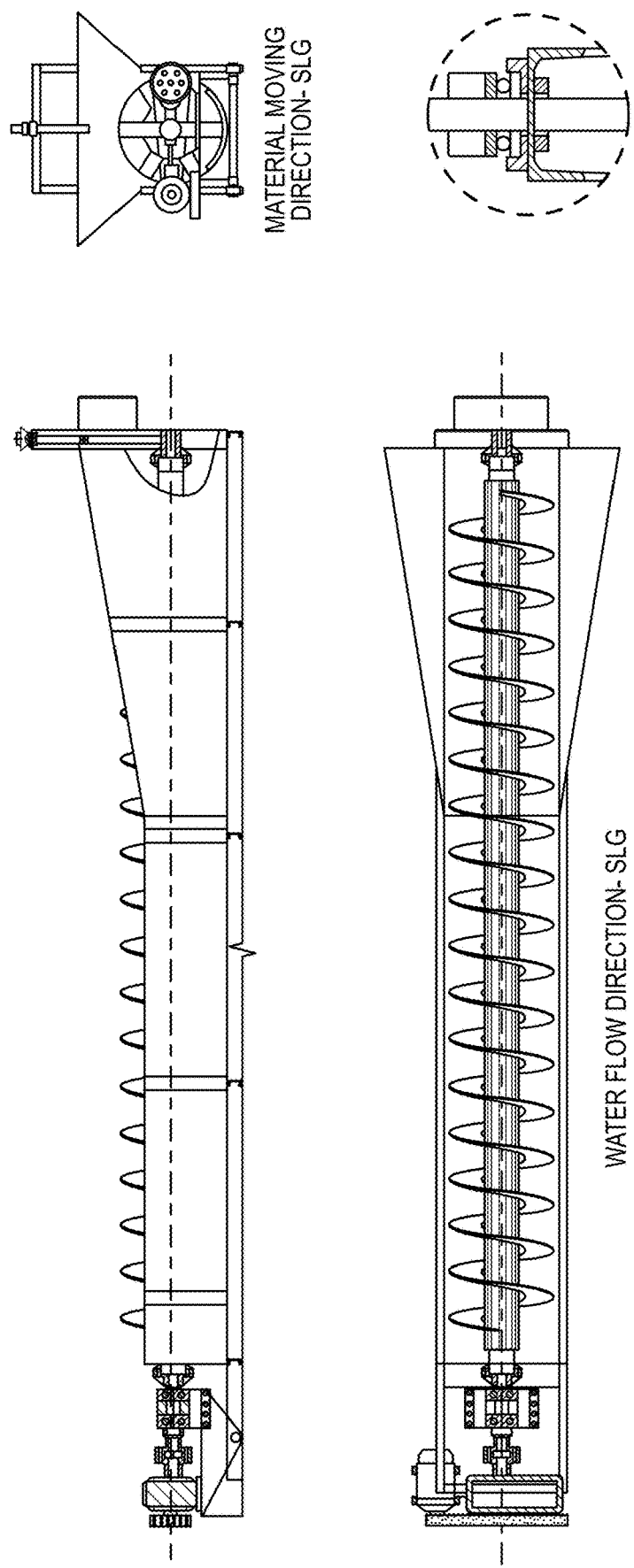
FIG. 9 depicts a further example of an apparatus that can be used for washing step (iv) of the process of the invention.

FIG. 9 depicts a further apparatus that can be used to carry out washing step (iv) of the process of the invention. In the apparatus shown in FIG. 9, an extrusion-type apparatus comprising a screw can be used for washing step (iv). The biomass powder to be washed enters the apparatus at the left hand side and is transferred by rotation of the screw towards the right hand side of the apparatus. The aqueous wash liquid enters the apparatus from the right hand side and is caused to flow towards the left hand side of the apparatus in an opposite direction to the direction of the passage of the biomass material. In this respect, the biomass material is washed by the aqueous wash liquid in a counter current mechanism since the fresh aqueous wash liquid passes through the apparatus in an opposite direction to the biomass material.

Accordingly, in some embodiments, washing step (iv) comprises washing the pulverised biomass powder or compressed biomass powder with an aqueous wash liquid via a counter-current washing mechanism, whereby washing step (iv) is carried out in an apparatus comprising a screw adapted to transport the pulverised biomass powder or compressed biomass powder in a first direction through the apparatus; and wherein the apparatus is adapted to receive and transport the aqueous wash liquid in a second direction through the apparatus that is opposite to the first direction such that that the aqueous wash liquid contacts the pulverised biomass powder or compressed biomass powder within the apparatus.

The adaptation of the pulverisation and compression steps prior to washing discussed in detail above are also particularly useful for the embodiments described above and exemplified in FIG. 9.

An advantage of the embodiments discussed above, such as those shown in FIG. 9, over embodiments such as those shown in FIG. 5 is that there is no need for the aqueous wash liquid to be drained and removed from the biomass material at each successive wash stage, before reintroduction to the biomass material at a preceding wash stage. Such successive drainage, collection and reintroduction of the wash liquid may increase the energy requirements of the process, so it is advantageous if such steps can be avoided to increase the efficiency of the process. In embodiments such as those shown in FIG. 9, the aqueous wash liquid simply flows through the apparatus in an opposite direction to the passage of the biomass material and there is no need for repeated drainage, collection and reintroduction of wash liquid.

The term counter-current wash mechanism is used herein in the context of the normal meaning of the term in the art. For example, a typical counter-current washing mechanism would involve contacting the portion of the biomass material that has had the most exposure to aqueous wash liquid with the freshest portion of aqueous wash liquid. After washing the portion of biomass material that has had the most exposure to aqueous wash liquid, the wash liquid then goes on to contact portions of biomass material that have had successively less exposure to the aqueous wash liquid. In this manner, a dissolved salt concentration gradient may be maintained between the aqueous wash liquid and the biomass material being washed, such that salts are continuously washed and removed from the biomass material. The apparatus shown in both FIGS. 5 and 9 thus involve a counter-current washing mechanism.

As described above, washing step (iv) is preferably carried out at temperatures of from 5° C. to 160° C., and more preferably at ambient temperatures of from 5° C. to 35° C. The washing step (iv) is also preferably carried out at pressures of 1.1 to 15 bar, and most preferably atmospheric pressure. A key advantage of the washing process of the present invention is that it may be carried out at atmospheric pressure and ambient temperature whilst still achieving a highly effective mineral salt removal. This results in the process being more commercially viable and also safer. It is believed that this higher effectiveness at more ambient conditions is due at least in part to the adaptations of the pulverising and compression steps discussed above. The adaptations mean that the process of the invention can achieve similar levels of mineral salt removal using ambient temperature and pressures that are achieved by techniques known in the art (such as those disclosed in WO2013162355) where temperatures of over 150° C. are used to achieve effective mineral salt removal.

Mechanically Dewatering the Washed Biomass Powder

Step (v) comprises mechanically dewatering the washed biomass powder. Preferably, the washed biomass powder is mechanically dewatered so as to provide a dewatered biomass powder and an aqueous effluent. Preferably, step (v) comprises squeezing or compressing the washed biomass powder. Optionally, the compression apparatus and method used can be the same as that used for compression step (iii) of the process. In alternative embodiments, step (v) can be as described in the mechanical dewatering step disclosed in WO2013162355.

The purpose of compression step (v) is to remove water from the washed biomass powder to improve the ease and efficiency of subsequent drying step (v).

Drying the Pulverised Biomass Powder

The biomass is dried in step (vi) of the process. Step (vi) of drying the dewatered biomass powder so as to provide a dried biomass powder typically comprises drying the dewatered biomass powder such that the dried biomass powder has a moisture content of from 10% by weight to 18% by weight, preferably from 12% by weight to 15% by weight. However, it will be appreciated that it is not essential that the dried biomass powder has a moisture content within this range.

The step of drying the biomass powder may also comprise mixing the biomass powder during drying. If one source of biomass is used in the process, this single source of biomass may be mixed. Alternatively, if more than one source of biomass is used in the process, the drying step may involve mixing the pulverised biomass powder with one or more additional sources of biomass. For example, where the one or more sources of biomass comprise at least two sources of biomass, whilst the two or more sources of biomass can be mixed during any step of the process of the invention, preferably the one or more sources of biomass are mixed during the drying step of the process of the invention. In some embodiments, the pulverised biomass powder is mixed with an additional source of biomass that has also been prepared by steps (i) to (v) of the present invention. In other embodiments, the one or more additional sources of biomass are not processed as described herein. For example, the dewatered biomass powder prepared as described herein may be mixed with one or more additional sources of biomass that are prepared in different ways.

The dewatered biomass powder may be dried using any suitable method, such as using standard drying cylinders known in the art. For example, in some embodiments, the drying step is carried out in a drying apparatus that comprises a rotating drying drum. The rotation of the rotating drying drum can be used to mix the dewatered biomass powder with one or more additional sources of biomass as described above. Typically, the rotating drying drum comprises a lifting plate. The lifting plate continuously raises material while the drying cylinder rotates. It has surprisingly been found by the inventors of the present invention that the use of a rotating drying cylinder with a lifting plate results in improved mixing of the one or more biomass powders where the one or more biomass powders are being dried with additional materials, or where two or more biomass powders are being mixed.

In embodiments where the dewatered biomass powder has a moisture content of less than 20 wt %, typically, the dewatered biomass powder is dried in a single drying cylinder. Accordingly, in these embodiments, the process of the invention comprises drying the dewatered biomass powder in only one single drying cylinder.

In embodiments where the dewatered biomass powder has a moisture content of greater than 20 wt %, the dewatered biomass powder is typically dried in multiple drying cylinders. Accordingly, in these embodiments, the process of the invention comprises drying the dewatered biomass powder in more than one drying cylinder. For example, the process may comprise drying the dewatered biomass powder in two or more, three or more, four or more, or five or more drying cylinders.

Molding the Dried Biomass Powder

The dried biomass powder is molded so as to provide a molded biomass product. The molding step may be carried out in any molding apparatus known in the art and in accordance with biomass molding techniques known in the art, and may include extrusion systems. Preferably, the molding step is carried out in a compression mold. Preferably, the compression mold comprises a mold product exit hole. The molding step may be carried out using an apparatus as described in CN105435708.

Preferably, the molding step comprises molding the dried biomass powder into pellets. Accordingly, in a preferred embodiment, the molded biomass product and solid biomass fuel product comprises biomass pellets.

Whilst it is known to mold biomass powder to produce molded biomass products, the inventors of the present invention have surprisingly discovered that adapting the molding step such that the density of the molded biomass product produced from said step is controlled so as to be within a certain range imparts certain advantageous properties to the final solid biomass fuel product. Specifically, controlling the molding step such that the density of the molded biomass product is within the range of from 1.0 to 1.35 kg/L has been found to impart advantageous properties to the final biomass fuel product. Preferably, the molding step is controlled such that the density of the molded biomass product is from 1.0 kg/L to 1.35 kg/L. Typically, the above mentioned densities are determined according to NY/T 1881.7-2010. Accordingly, in some embodiments, the molding step is controlled such that the density of the molded biomass product is from 1.0 kg/L to 1.35 kg/L, wherein the density is determined according to NY/T 1881.7-2010.

The molding step may be controlled in a variety of ways. Where the molding process comprises the use of a compression mold, the density is typically controlled by using a compression ratio of less than 9, and more preferably from 3.8 to 9. Typically, the smaller the compression ratio, the lower the density of the molded biomass product. However, the higher the compression ratio, the lower the yield of the molded biomass product.

In some embodiments, a compression ratio of from 3.8 to 6.5 is used.

In other embodiments, a compression ratio of from 6 to 9 is used, preferably 6.5 to 9, and most preferably 6.5 to 8.

The optimum compression ratio to use to achieve the preferred densities for the molded biomass product discussed above will be dependent upon the source of biomass used in the process. Typically, denser biomass source starting materials will require a compression ratio at the lower end of the range discussed above to achieve the preferred densities, whereas biomass source starting materials of lower density will require a compression ratio at the upper end of the range discussed above to achieve the preferred densities.

In embodiments where the one or more sources of biomass comprise straw or corn straw, preferably, a compression ratio of from 6 to 9 is used, more preferably 6.5 to 9, and most preferably 6.5 to 8.

The compression ratio for a compression mold with a mold product exit hole may be defined as the ratio of the length to the diameter of the mold product exit hole.

Figure 6:
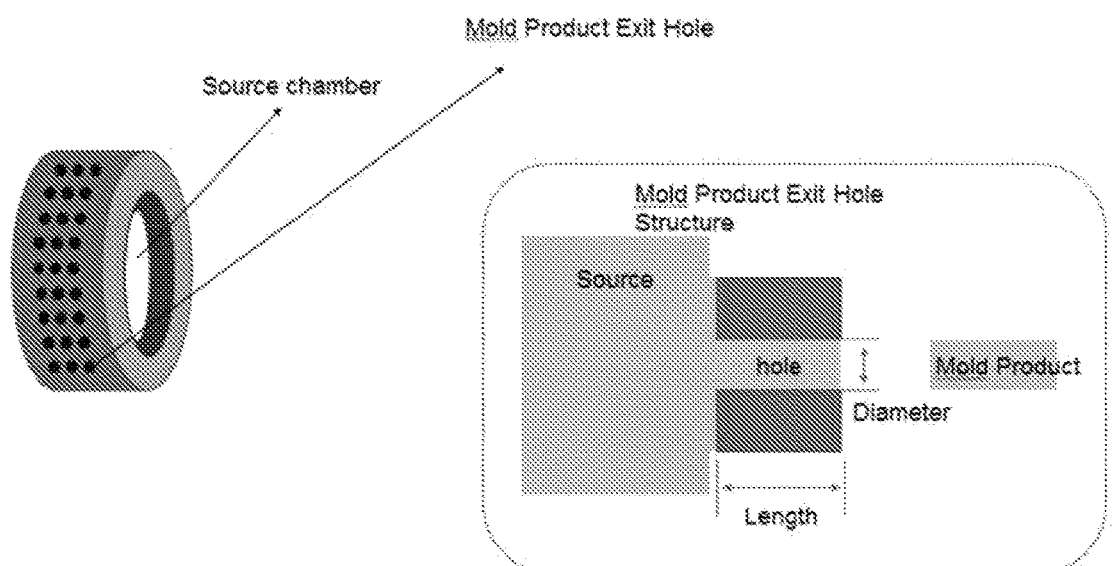
FIG. 6 is a diagram of a compression mold that may be used in accordance with the process of the invention.

FIG. 6 shows an example of a compression mold that may be used in accordance with the present invention. The dried biomass powder is inserted into the interior of the mold before being squeezed from inside the mold by pressure such that it exits the mold product exit hole in the Figure. The compression ratio is shown in the Figure as the ratio of the length of the product out hole to its diameter.

In the process of the invention, preferably, the step (vii) of molding the dried biomass powder comprises adapting the molding step such that the density of the molded biomass product is controlled to be within the range of from 1.1 kg/L to 1.35 kg/L, typically wherein the density is determined according to NY/T 1881.7-2010. Preferably, the density is controlled by using a compression mold and controlling the compression ratio of the compression mold. More preferably, the compression ratio is from 6.5 to 8. In highly preferable embodiments, the compression ratio is from 6.5 to 8 and the one or more sources of biomass comprise straw, corn straw, or a combination thereof.

Controlling the density of the molded biomass product during the molding step has been found, surprisingly, to provide a final biomass fuel product with increased water proof capacity. Preferably, the solid biomass fuel product produced from a molded biomass product with a density within the range of from 1.1 kg/L to 1.35 kg/L is sufficiently water proof for up to 20 days, and preferably up to 30 days.

Preferably, an additive is added to the dried biomass powder prior to step (vii) of molding the dried biomass powder. Said additive is believed to improve the molding process and increase the yield of the molded biomass product produced from the molding step. Suitable additives are known in the art and include, but are not limited to, starch, or starch derivatives.

Typically, other than additives such as those discussed above, no other fuel source is added to the dried pulverised biomass powder during the molding step. Accordingly, the molded biomass product of the molding step typically comprises only material derived from biomass as the fuel source in the solid biomass fuel. For example, when the dried pulverised biomass powder is molded into pellets, typically, no other fuel source is added to the dried pulverised biomass products prior to molding such that the solid biomass fuel pellets produced at the end of the process only contain a fuel source derived from biomass. In preferable embodiments, the solid biomass fuel thus comprises at least 50% by weight of the total fuel content of the fuel, such as at least 60% by weight, at least 70% by weight, at least 80% by weight, at least 90% by weight and preferably at least 95% by weight of material derived from biomass.

Where the term total fuel content of the solid fuel is used herein, this is intended to refer to the component of the solid fuel that is combustible material such as biomass derived material and coal. The term fuel content in relation to solid fuel is not intended to encompass additives that may be present in the solid fuel pellets that do not themselves combust to produce energy.

The molding step has also been found to enhance the waterproof properties of the final biomass solid fuel product. The increase in density that occurs during the molding step means that it is harder for water to penetrate the denser molded biomass product particles.

Furthermore, with a denser product, more biomass is concentrated in the interior of the molded product, and so is not in direct contact with water.

Heating the Molded Biomass Product

The molded biomass product is heated so as to produce a solid biomass fuel. The heating is carried out at a temperature of from 160° C. to 420° C. for a time period of from 0.25 to 5 hours. Preferably, the step of heating the molded biomass product is carried out for a time period of from 0.4 to 2 hours. Preferably, the step of heating the molded biomass product comprises heating the molded biomass product to a temperature of from 180° C. to 350° C., and more preferably to a temperature of from 210° C. to 280° C.

Preferably, the step (viii) of heating the molded biomass product comprises heating the molded biomass product under conditions so as to induce torrefaction of the molded biomass product. Torrefaction is a process of mild pyrolysis in which the heating is carried out in a low oxygen atmosphere such as an atmosphere of less than 10% oxygen content. Suitable conditions and processes of torrefaction are known in the art. Accordingly, preferably step (viii) of heating the molded biomass product comprises torrefaction.

The heating step may be carried out in any suitable apparatus known in the art for heating the molded biomass product. For example, the heating step may be carried out in apparatus and using process conditions as disclosed in EP3287509A1.

Preferably, step (viii) of heating the molded biomass product is adapted so as to control the uniformity of the solid biomass fuel, optionally wherein adapting step (viii) so as to control the uniformity of the solid biomass fuel comprises conducting step (viii) in an apparatus in which the molded biomass product is rotated whilst being heated, optionally, wherein adapting step (viii) so as to control the uniformity of the solid biomass fuel comprises controlling the speed or direction of rotation of the molded biomass product, optionally wherein the molded biomass product is rotated in the apparatus in both an anticlockwise and clockwise direction. The uniformity of the solid biomass fuel is also optimised by the heating temperatures and time periods discussed above.

In some embodiments, the process of the invention may comprise a step of cooling the solid biomass fuel after heating. Where the process of the invention comprises a cooling step after the step of heating the biomass, the cooling step may comprise rotating the solid biomass fuel. The biomass may be rotated in a suitable apparatus such as those disclosed in EP3287509A1. Preferably, both heating step (viii) and the step of cooling the biomass comprise rotating the biomass. Where the biomass is rotated in either the cooling step or the heating step, the biomass may be rotated in different directions, such as both clockwise and anti-clockwise in successive cycles.

The term 'uniformity' of the solid biomass product is used to refer to the solid biomass fuel or molded biomass product having constant or similar properties across each particle of solid biomass fuel or molded biomass product and across the plurality of particles within a bulk sample of the solid biomass fuel product or molded biomass product. For example, but not limited to, the densities of the particles, the ease of combustion of the particles, the chemical composition of the particles, and the water resistant properties of the particles. Uniformity is a highly desirable property for biomass fuels for use in combustion processes.

It has also been found by the inventors that controlling the heating step in the manner discussed above additionally aids in providing a solid biomass fuel product with enhanced water proof properties compared to the biomass fuels of the prior art. During the heating step, hydrophilic compounds present in the biomass powders that absorb water are degraded.

Furthermore, the heating step causes oils present in the biomass powders to migrate to the exterior of the biomass powder particles, increasing the hydrophobicity of said particles.

Washing the Solid Biomass Fuel

As discussed above, the process of the invention involves step (ix) of washing the solid biomass fuel with an aqueous wash liquid. The aqueous liquid preferably comprises pure water. However, water with certain substances dissolved therein such as certain salts may also be used to wash the solid biomass fuels of the present invention.

The solid biomass fuel may be immersed in or sprayed with the aqueous wash liquid. In preferable embodiments, the solid biomass fuel is sprayed with the aqueous wash liquid in washing step (ix).

Step (ix) of washing the solid biomass fuel may also comprise additional steps for removing dust particles from the solid biomass fuel, as discussed in further detail above.

Figure 7:
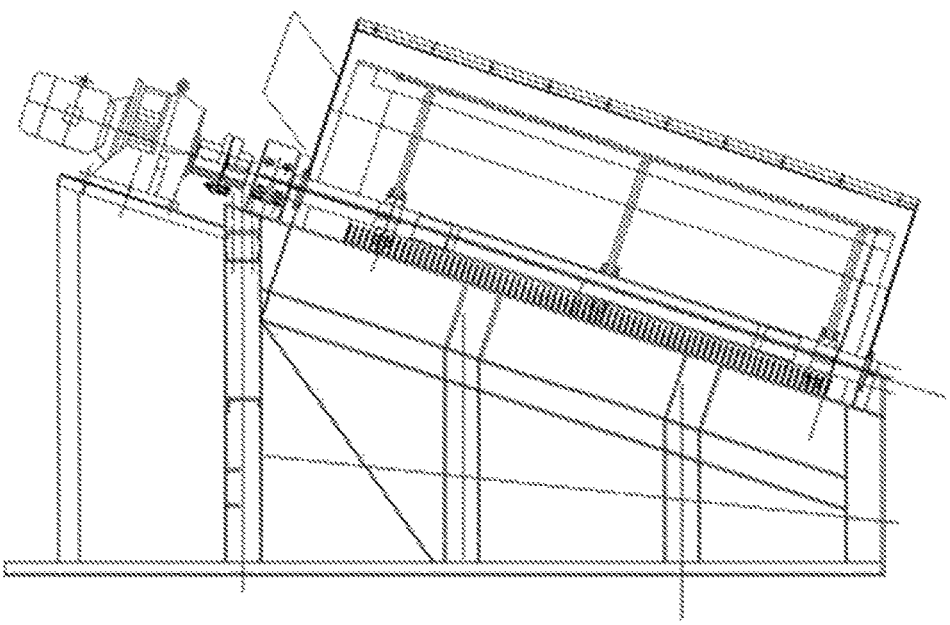
FIGS. 7 and 8 depict apparatus that may be used for rolling, rotation and vibration of biomass solid fuel particles in the process of the invention.
Figure 8:
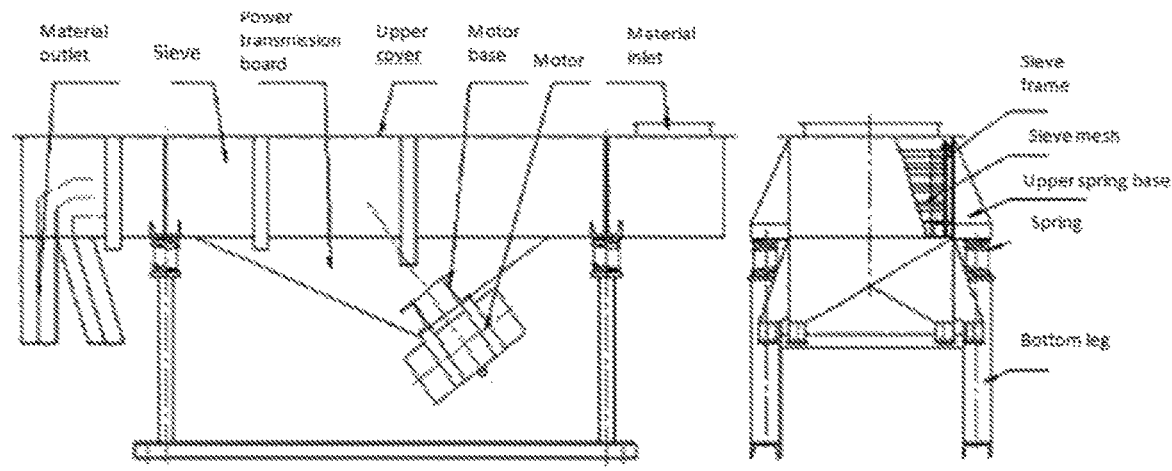

The inventors have found that the dust on the surface of the biomass solid fuel particles may be removed by inducing friction between the particles. For example, dust that is adhered to the particles may be removed by inducing friction by means such as vibrating or rotating the solid biomass fuel particles. Accordingly, the step (ix) may comprise inducing friction between the particles of solid biomass fuel. For example, step (ix) may comprise subjecting the particles to vibration, rotation, rolling, or any combination thereof. Suitable apparatus for conducting rolling, rotation, and vibration of the solid biomass fuel particles are known to the person skilled in the art, and are shown in FIGS. 7 and 8. An example of an apparatus that may be used to remove dust from the particles is a rotating drum sieve.

Step (ix) may comprise removing dust particles from the solid biomass fuel with a screen. Typically, the screen has a pore size of from 2 mm to 10 mm, preferably 2 mm to 8 mm, more preferably from 2 mm to 5 mm, and most preferably from 2 mm to 3 mm. Dust particles that are admixed with the solid biomass fuel particles may be separated from the solid biomass fuel by passing through the screen. The larger solid biomass fuel particles do not pass through the screen and are thus separated from the dust particles. Suitable apparatus and methods for performing the screening step are known to those skilled in the art, and any of said suitable apparatus may be used. For example, an apparatus that employs screening, rolling and rotating the solid biomass fuel may be used to remove dust particles from the solid biomass fuel. In the use of such a device, solid biomass fuel may be laid upon a screen, and the screen may be driven to roll and rotate upon its axis by operation of a motor. During rolling/tilting and rotation of the screen, material on the sieve surface of the screen is turned over. Some material passes through the screen and is separated from material that does not pass through the screen. The rolling and rotation of the screen causes material stuck in the pores of the screen to fall through and thus clogging of the pores of the screen is prevented. Alternatively, an apparatus that vibrates and screens the solid biomass fuel particles may be used. In this case, a motor can be used to vibrate the screen which may cause material to be thrown up on the screen surface. This process may cause small particles adhered to larger ones to come loose and then pass through the pores in the screen. An example of an apparatus that employs a screen and vibration to separate larger particles from smaller particles, where the smaller particles may or may not be adhered to the larger particles is a device as taught in CN201324717.

Accordingly, methods of the invention may comprise subjecting the solid biomass fuel particles to one or more of rolling, rotation and vibration so as to induce friction between the solid biomass fuel particles which causes dust particles adhered to said solid biomass fuel particles to be removed from said particles. The methods then preferably comprise subjecting the mixture of solid biomass fuel particles and dust particles to a screening step as discussed above to remove said dust particles from said solid biomass fuel particles. Accordingly, step (ix) is an effective post-treatment for removing dust from said particles of solid biomass fuel.

In embodiments where a screen is used, the screen may additionally be used to remove and drain the wash liquid used in step (ix), for example, where the solid biomass fuel particles are placed upon the screen and sprayed with the aqueous wash liquid.

The Solid Biomass Fuel Product

The solid biomass fuel product may have any of the physical properties discussed above.

As discussed above, the biomass solid fuel of the invention preferably comprises pellets. The pellets may be any suitable size. Preferably, the pellets have a diameter of from 3 mm to 100 mm, and more preferably, 5 mm to 8 mm. Preferably, the pellets have a length of from 20 mm to 60 mm, and more preferably from 30 mm to 50 mm. As discussed above, surprisingly, it has been found that the solid biomass fuel product of the invention has enhanced waterproof characteristics compared to solid biomass fuel products made by prior art processes. This is believed to be due to controlling the pulverising, molding and/or heating step as discussed above. Biomass fuels of the prior art have been found by the inventors to be sufficiently water proof for only up to 10 days. In contrast, it has been found the solid biomass fuel products of the invention are sufficiently water proof up to 20 days, preferably 30 days and more preferably 40 days.

The water proof properties of the solid biomass fuels may be determined according to standard tests of the Energy Research Centre of the Netherlands (ECN).

The moisture content of the biomass solid fuel of the invention may also be determined by standard ECN test methods. The internal moisture content of the solid biomass fuel of the invention is typically less than 8 wt %, preferably less than 6 wt %, and more preferably less than 5 wt %, wherein the internal moisture content is determined according to DIN EN 14774.

The biomass solid fuel has a base moisture content of typically less than 10 wt %, preferably less than 8 wt %, and most preferably less than 6 wt %, wherein the base moisture content is determined according to GB/T211-2017.

The solid biomass fuel of the invention has also been found to have unexpectedly high mechanical durability. The mechanical durability is typically higher than 90%, and preferably higher than 95%. This is advantageous since biomass pellets of 95% mechanical durability or greater have been found to be able to stored outside without damage to for periods as long as two months. In contrast, biomass pellets with less than 90% mechanical durability typically are damaged by rainfall and are not able to be stored outside. Accordingly, high mechanical durability is an additional advantage of biomass pellets of the invention.

An additional advantage associated with high durability of the solid biomass fuel particles is that if the pellets are somehow broken by force, they fall apart in larger pieces than pellets with low mechanical durability. This minimises any dust explosion risks.

As discussed above, in preferable embodiments, typically, other than additives such as those discussed above, no other fuel source is added to the heated biomass product during the molding step. Accordingly, the solid biomass fuel typically comprises only material derived from biomass as the fuel source in the solid biomass fuel. For example, when the heated biomass product is molded into pellets, typically, no other fuel source is added to the heated biomass products prior to molding such that the solid biomass fuel pellets produced by the molding step only contain a fuel source derived from biomass.

In preferable embodiments, the solid biomass fuel thus comprises at least 50% by weight of the total fuel content of the fuel, such as at least 60% by weight, at least 70% by weight, at least 80% by weight, at least 90% by weight and preferably at least 95% by weight of material derived from biomass.

Combustion Processes

The product of the present invention may be used in a variety of different combustion processes. The suitability of said products for use in a particular process will be apparent to those of skill in the art. For example, the biomass fuel of the invention may be used in a combustion process in a power plant or industrial process on its own. Alternatively, the biomass product of the invention may be used in a combustion process along with an additional fuel such as coal in a co-firing process.

Advantageously, products of the invention have been found to provide very low PM1.0 emissions when compared to other biomass fuels known in the art. Additionally, the PM1.0 emissions of the process are lower than processes that involve the combustion of coal.

Advantageously, the improved physical properties of biomass fuels of the invention have been found to render the biomass particularly suitable for co-firing with coal. For example, the improved quality and uniformity of the product enable the biomass fuel of the invention to be co-fired with coal particularly well. The improved water proof properties of the biomass fuel of the invention also mean that the biomass is particularly suited to being co-fired with coal as well as being made easier to store and transport due to its water proof nature.

Example 1

The process of the invention was carried out upon a biomass source that consisted essentially of corn straw. The washing process used for washing step (iv) involved four successive wash stages, and was carried out using an aqueous wash liquid at ambient (unheated) temperature and at atmospheric pressure. The process comprised compression step (iii). The weight percentage of various minerals in the dewatered biomass powder after washing step iv) and mechanical dewatering step (v) are given in the table below.

TABLE 1

| | Weight percentage of mineral in dewatered biomass powder after step (v) | Weight percentage of mineral in solid biomass fuel product |
|---|---|---|
| Air-dried basis ash Ada % | 4.67 | 6.96 |
| the potassium content (weight %) | 0.05 | 0.06 |
| the nitrogen content (weight %) | 0.76 | 0.88 |

TABLE 1-continued

| | Weight percentage of mineral in dewatered biomass powder after step (v) | Weight percentage of mineral in solid biomass fuel product |
|---|---|---|
| the chlorine content (weight %) | 0.015 | 0.017 |
| the sulfur content (weight %) | 0.08 | 0.06 |

Example 2

The process of the invention was carried out upon a biomass source that consisted essentially of straw. The washing process used for washing step (iv) involved four successive wash stages, and was carried out using an aqueous wash liquid at ambient (unheated) temperature and at atmospheric pressure. The process comprised compression step (iii). The weight percentage of various minerals in the dewatered biomass powder after washing step iv) and mechanical dewatering step (v) are given in the table below.

TABLE 2

| | Weight percentage of mineral in dewatered biomass powder after step (v) | Weight percentage of mineral in solid biomass fuel product |
|---|---|---|
| Air-dried basis ash Ada % | 8.02 | 10.93 |
| the potassium content (weight %) | 0.09 | 0.1 |
| the nitrogen content (weight %) | 0.44 | 0.66 |
| the chlorine content (weight %) | 0.009 | 0.009 |
| the sulfur content (weight %) | 0.05 | 0.03 |

The data in Tables 1 and 2 shown above shows that effective mineral salt removal can be obtained by washing the biomass source starting material. Advantageously, using the process of the invention, effective mineral salt removal can be obtained using mild and ambient conditions for the washing step. Using atmospheric pressure and ambient temperature (i.e. unheated water), effective mineral salt removal is obtained. This is in contrast to known washing processes which typically involve the use of far higher temperature water in order to achieve effective mineral salt removal, and higher pressures in order to keep the water used in the process as a liquid.

Other properties of the solid biomass fuels and dewatered biomass powders produced in examples 1 and 2 are shown in Table 3 below.

TABLE 3

| | Fixed carbon content Weight % | Volatile matter content Weight % | Ash content Weight % | Internal moisture content Weight % | Received base moisture content Weight % | Gross calorific value on air dried basis MJ/Kg | Density g/cm³ |
|---|---|---|---|---|---|---|---|
| corn straw raw material | 19.11 | 71.82 | 7.58 | 1.50 | 13.62 | 4265 | |
| corn straw dewatered biomass powder | 14.61 | 79.22 | 4.93 | 1.25 | 10.69 | 4379 | |
| corn straw solid biomass fuel | 26.70 | 66.06 | 6.86 | 0.37 | 3.78 | 5099 | 1.2358 |
| straw raw material | 16.81 | 69.18 | 12.36 | 1.66 | 10.43 | 3923 | |
| straw dewatered biomass powder | 13.77 | 76.76 | 8.28 | 1.19 | 11.55 | 4182 | |
| Straw solid biomass fuel | 24.97 | 63.66 | 11.24 | 0.07 | 2.63 | 4797 | 1.2619 |

Example 3

The same processes as those described above in Examples 1 and 2 were carried out using sesame straw, banana tree, peanut straw, palm empty fruit bunches, palm fiber, palm shell, and bamboo as the biomass sources.

For all biomass starting materials, it was found that the nitrogen and chlorine content could be reduced by at least 10% by the washing step (iv). In all cases, the sulphur content was reduced by at least 40% by washing step (iv).

In all cases, when the mineral content of the solid biomass fuel was compared to the biomass source starting material, the potassium content was reduced by at least 90%; the sulphur content was reduced by at least 50%; and the nitrogen content was significantly reduced.

In all cases, the ash content of the biomass source was reduced by 30% or more by washing step (iv) and the calorific value was increased by 2% or more by washing step (iv).

In all cases, the volatile matter content of the solid biomass fuel was reduced by 6% or more relative to the biomass starting material; the fixed carbon content of the solid biomass fuel was increased by 35% or more relative to the biomass starting material; and the calorific value of the solid biomass fuel was increased by 16% or more relative to the biomass starting material.

The invention claimed is:

1. A process for producing a solid biomass fuel, wherein the process comprises the following sequential steps:
    (i) providing one or more sources of biomass;
    (ii) pulverizing the one or more sources of biomass to provide a pulverized biomass powder with an average particle diameter (D50) of from 1000 μm to 20,000 μm;
    optionally, (iii) compressing the pulverized biomass powder to provide a compressed biomass powder;
    (iv) washing the compressed biomass powder or the pulverized biomass powder with an aqueous wash liquid to provide a washed biomass powder;
    (v) mechanically dewatering the washed biomass powder to provide a dewatered biomass powder and an aqueous effluent;
    (vi) drying the dewatered biomass powder to provide a dried biomass powder;
    (vii) molding the dried biomass powder so as to provide a molded biomass product;
    (viii) heating the molded biomass product to a temperature of from 160° C. to 420° C. for a time period of from 0.25 to 5 hours so as to provide a solid biomass fuel; and
    (ix) washing the solid biomass fuel with an aqueous wash liquid.

2. A process according to claim 1, wherein the one or more sources of biomass comprise, consist essentially of, or consist of corn straw, sesame straw, straw, banana tree, peanut straw, palm empty fruit bunches (EFB), palm fiber, palm shell, bamboo, palm tree trunk, *Calliandra calothyrsus, Acacia mangium, Albizia chinensis, Hevea brasiliensis*, rice husk, yam, corn cob, wood, grass or any combination thereof.

3. A process according to claim 1, wherein step (iv) of washing the compressed biomass powder or pulverized biomass powder with an aqueous wash liquid to provide a washed biomass powder comprises washing the compressed biomass powder or pulverized biomass powder in from two to ten successive washing stages, wherein each successive washing stage comprises spraying the compressed biomass powder or pulverized biomass powder with the aqueous wash liquid and/or immersing the compressed biomass powder or pulverized biomass powder in the aqueous wash liquid.

4. A process according to claim 3, wherein the successive washing stages are performed in a counter current manner whereby aqueous wash effluent from a later washing stage is used as the aqueous washing liquid for an earlier washing stage.

5. A process according to claim 3, wherein the aqueous wash liquid is at a temperature of from 5° C. to 160° C. during step (iv) of washing the compressed biomass powder or pulverized biomass powder with an aqueous wash liquid to provide a washed biomass powder.

6. A process according to claim 1, wherein the process comprises step (iii) of compressing the pulverized biomass powder to provide a compressed biomass powder.

7. A process according to claim 6, wherein the pulverized biomass powder has a moisture content of at least 30% by weight, and wherein after compressing step (iii), the compressed biomass powder has a moisture content of less than 30% by weight.

8. A process according to claim 1, wherein step (vii) of molding the dried biomass powder so as to provide a molded biomass product comprises adapting the molding step such that the density of the molded biomass product is controlled, wherein adapting the molding step such that the density of the molded biomass product is controlled comprises controlling the compression ratio of a mold used in said molding step.

9. A process according to claim 1, wherein step (viii) of heating the molded biomass product is carried out for a time period of from 0.4 to 2.5 hours, and wherein the step of heating the molded biomass product comprises heating the molded biomass product to a temperature of from 180° C. to 350° C.

10. A process according to claim 1, wherein step (viii) of heating the molded biomass product is adapted so as to control the uniformity of the solid biomass fuel, wherein adapting step (viii) so as to control the uniformity of the solid biomass fuel comprises conducting step (viii) in an apparatus in which the molded biomass product is rotated whilst being heated.

11. A process according to claim 1, wherein step (ix) of washing the solid biomass fuel with an aqueous wash liquid comprises spraying the solid biomass fuel with the aqueous wash liquid.

12. A process according to claim 1, wherein the process further comprises a step of removing dust particles from the solid biomass fuel; and wherein the step of removing dust particles from the solid biomass fuel comprises:
    (a) removing dust particles from the solid biomass fuel with a screen; wherein the screen has a pore size of from 2 mm to 8 mm;
    (b) removing dust particles from the solid biomass fuel with a screen; wherein a drum sieve is used to as a screening device to remove the dust particles from the solid biomass fuel;
    (c) wherein the step of removing dust particles from the solid biomass fuel comprises subjecting the solid biomass fuel to vibration, rotation, rolling, or any combination thereof;
    (d) wherein the step of removing dust particles from the solid biomass fuel comprises subjecting the solid biomass fuel to vibration, and wherein the step of removing dust particles from the solid biomass fuel comprises using a vibrating screen, wherein the vibrating screen has a pore size of from 2 mm to 8 mm; and/or
    (e) removing dust particles from the solid biomass fuel with a screen; and wherein the step of removing dust particles from the solid biomass fuel is carried out concurrently to step (ix) of washing the solid biomass fuel with an aqueous wash liquid, wherein step (ix) of washing the solid biomass fuel with an aqueous wash liquid comprises spraying the solid biomass fuel with the aqueous wash liquid, and wherein the screen is used to drain the aqueous wash liquid from the solid biomass fuel.

13. A process according to claim 1, wherein the solid biomass fuel has one or more of the following properties: an ash content of the solid biomass fuel is 15% by weight or less; the potassium content of the solid biomass fuel is 0.2% by weight or less; the nitrogen content of the solid biomass fuel is 2% by weight or less; the chlorine content of the solid biomass fuel is 0.05% by weight or less; the sulfur content of the solid biomass fuel is 0.2% by weight or less; the fixed carbon content of the solid biomass fuel is 40% by weight or less; the volatile matter content of the solid biomass fuel is 15% by weight or less; the internal moisture content of the solid biomass fuel is 1% by weight or less; the received base moisture content of the solid biomass fuel is 6% by weight or less; the calorific value of the solid biomass fuel is 4500 MJ/Kg or more; the bulk density of the solid biomass fuel as determined according to DIN EN 15103 is from 1.0 to 1.4 g/cm$^3$; and/or wherein material derived from biomass is present in the solid biomass fuel in an amount of at least 95% by weight of the total fuel content of the solid biomass fuel; wherein the sulfur content is determined according to DIN EN15289; the nitrogen content is determined according to DIN EN 15104; the fixed carbon content is determined according to DIN EN 51734; the ash content is determined according to EN 14775 at 550° C.; the volatile matter content is determined according to DIN EN 15148; the calorific value is determined according to DIN EN 14918; the chlorine content is determined according to ISO16994: 2015; the potassium content is determined according to ISO16995:2015; the received base moisture content of the solid biomass fuel is determined according to GB/T211-2017; and the internal moisture content of the solid biomass fuel is determined according to DIN EN 14774.

14. A process for producing a solid biomass fuel, wherein the process comprises the following sequential steps:
    (i) providing one or more sources of biomass;
    (ii) pulverizing the one or more sources of biomass to provide a pulverized biomass powder with an average particle diameter (D50) of from 1000 μm to 20,000 μm;
    optionally, (iii) compressing the pulverized biomass powder to provide a compressed biomass powder;
    (iv) washing the compressed biomass powder or pulverized biomass powder with an aqueous wash liquid to provide a washed biomass powder;
    (v) mechanically dewatering the washed biomass powder to provide a dewatered biomass powder and an aqueous effluent;
    (vi) drying the dewatered biomass powder to provide a dried biomass powder;
    (vii) molding the dried biomass powder so as to provide a molded biomass product; and
    (viii) heating the molded biomass product to a temperature of from 160° C. to 420° C. for a time period of from 0.25 to 5 hours so as to provide a solid biomass fuel;
    wherein the one or more sources of biomass comprise, consist essentially of, or consist of: sesame straw, palm empty fruit bunches (EFB), palm fiber, oil palm tree, banana tree, *Calliandra calothyrsus*, *Albizia chinensis*, rice husk, yam, corn cob, *Pennisetum* sinese Roxb, or any combination thereof.

15. A solid biomass fuel derived from one or more sources of biomass, wherein the bulk density of the solid biomass fuel as determined according to DIN EN 15103 is from 1.0 to 1.4 g/cm$^3$; the calorific value of the solid biomass fuel as determined according to DIN EN 14918 is 4500 MJ/Kg or more; wherein material derived from biomass is present in the solid biomass fuel in an amount of at least 95% by weight of the total fuel content of the solid biomass fuel; and wherein the one or more sources of biomass:
- (i) consist of, or consist essentially of sesame straw;
- (ii) consist of, or consist essentially of palm empty fruit bunches;
- (iii) consist of, or consist essentially of palm fiber;
- (iv) consist of, or consist essentially of banana tree; or
- (v) consist of, or consist essentially of oil palm tree trunk.

16. A combustion process comprising the step of combusting a solid biomass fuel in accordance with claim 15 so as to produce energy.

17. A process according to claim 1, wherein washing step (iv) comprises washing the pulverized biomass powder or compressed biomass powder with an aqueous wash liquid via a counter-current washing mechanism, whereby washing step (iv) is carried out in an apparatus comprising a screw adapted to transport the pulverized biomass powder or compressed biomass powder in a first direction through the apparatus; and wherein the apparatus is adapted to receive and transport the aqueous wash liquid in a second direction through the apparatus that is opposite to the first direction such that that the aqueous wash liquid contacts the pulverized biomass powder or compressed biomass powder within the apparatus.

* * * * *